(12) United States Patent
Preidt et al.

(10) Patent No.: US 10,322,876 B2
(45) Date of Patent: Jun. 18, 2019

(54) METHOD FOR STOCKPILING PIECE GOODS IN A STORAGE RACK, AND STORAGE SYSTEM

(71) Applicant: TGW Logistics Group GmbH, Wels (AT)

(72) Inventors: Peter Preidt, Holzhausen (AT); Harald Johannes Schroepf, Wels (AT)

(73) Assignee: TGW Logistics Group GmbH, Wels (AT)

(*) Notice: Subject to any disclaimer, the term of this patent is extended or adjusted under 35 U.S.C. 154(b) by 121 days.

(21) Appl. No.: 15/555,625

(22) PCT Filed: Feb. 19, 2016

(86) PCT No.: PCT/AT2016/050034
§ 371 (c)(1),
(2) Date: Jan. 5, 2018

(87) PCT Pub. No.: WO2016/141395
PCT Pub. Date: Sep. 15, 2016

(65) Prior Publication Data
US 2018/0127208 A1    May 10, 2018

(30) Foreign Application Priority Data
Mar. 6, 2015    (AT) .................................. 50179/2015

(51) Int. Cl.
*B65G 1/04*    (2006.01)
*B65G 1/137*    (2006.01)
(52) U.S. Cl.
CPC ......... *B65G 1/0435* (2013.01); *B65G 1/0421* (2013.01); *B65G 1/0485* (2013.01); *B65G 1/1371* (2013.01)

(58) Field of Classification Search
CPC combination set(s) only.
See application file for complete search history.

(56) References Cited

U.S. PATENT DOCUMENTS 6,923,612 B2    8/2005    Hansl
8,494,673 B2 *  7/2013    Miranda .............. B65G 1/1378
                                                700/213
(Continued)

FOREIGN PATENT DOCUMENTS

DE    10 2004 046 176 A1    4/2006
DE    10 2011 002 322 A1    10/2012
(Continued)

OTHER PUBLICATIONS

International Search Report of PCT/AT2016/050034, dated Jul. 5, 2016.

*Primary Examiner* — Kyle O Logan
(74) *Attorney, Agent, or Firm* — Collard & Roe, P.C.

(57) ABSTRACT

A method for storing piece goods of different dimensions in storage channels conveys the goods to the channels using a piece goods receiving device movable along the channels in an x direction and into the channels using a transport device extendible into the channels in a z direction. The goods are stored tightly-packed in the channels. A width dimension of the goods is detected and the goods are assigned to the different width classes. The goods are supplied to a pick-up station selectively according to width classes using a conveying system, then transferred to the receiving device, and using the transport device a group of goods is moved from the receiving device into the channel simultaneously in a storage direction and in a depth direction of the channel so that a lateral wall of the rearmost good in the storage direction is substantially flush with the channel end edge.

20 Claims, 20 Drawing Sheets

(56) References Cited

U.S. PATENT DOCUMENTS

Figure 1:
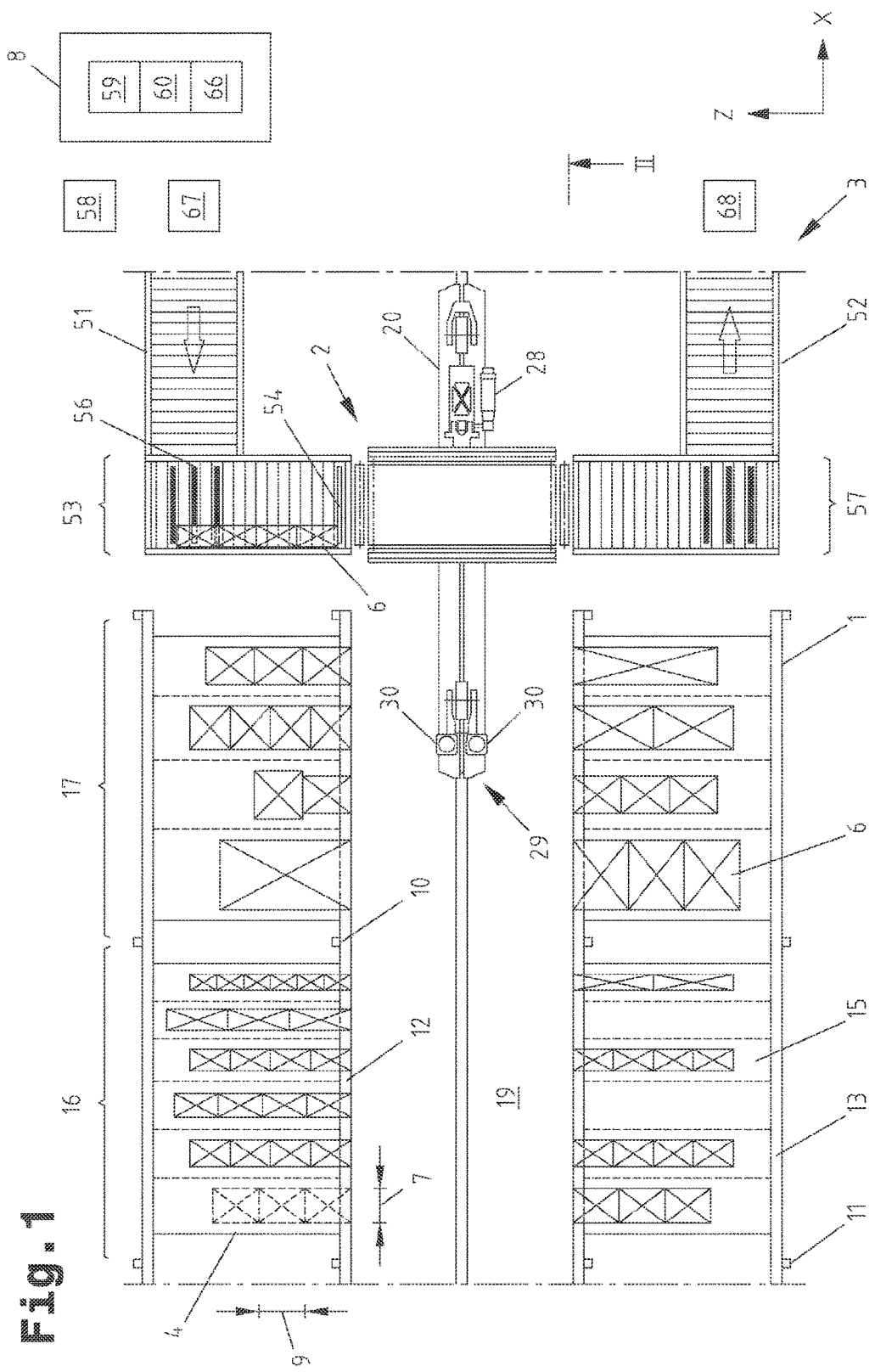

| | | | |
|---|---|---|---|
| 8,594,835 | B2 | 11/2013 | Lert et al. |
| 8,682,476 | B2 * | 3/2014 | Freudelsperger .... B65G 1/1378 |
| | | | 700/213 |
| 8,740,542 | B2 | 6/2014 | Wolkerstorfer |
| 9,428,336 | B2 * | 8/2016 | Hagen ................... G07F 11/165 |
| 2003/0185656 | A1 | 10/2003 | Hansl |
| 2012/0186942 | A1 | 7/2012 | Toebes et al. |
| 2014/0277689 | A1 | 9/2014 | Salichs |
| 2014/0308098 | A1 * | 10/2014 | Lert ..................... B65G 1/0492 |
| | | | 414/281 |
| 2015/0336741 | A1 * | 11/2015 | Ahammer ............ B65G 1/0485 |
| | | | 414/281 |

FOREIGN PATENT DOCUMENTS

| | | |
|---|---|---|
| EP | 1 422 169 A2 | 5/2004 |
| EP | 1 627 830 A1 | 2/2006 |
| EP | 2 234 904 B1 | 8/2011 |
| EP | 2 433 882 A1 | 3/2012 |
| EP | 2 543 446 A1 | 1/2013 |
| EP | 2 687 463 A1 | 1/2014 |
| FR | 2 964 957 A1 | 3/2012 |
| JP | 2000-118639 A | 4/2000 |
| JP | 2005-219832 A | 8/2005 |
| JP | 41-00322 B2 | 6/2008 |
| JP | 2008-143660 A | 6/2008 |
| JP | 2012-071929 A | 4/2012 |
| WO | 2009/143548 A1 | 12/2009 |
| WO | 2010/090515 A1 | 8/2010 |
| WO | 2013/090970 A2 | 6/2013 |

* cited by examiner

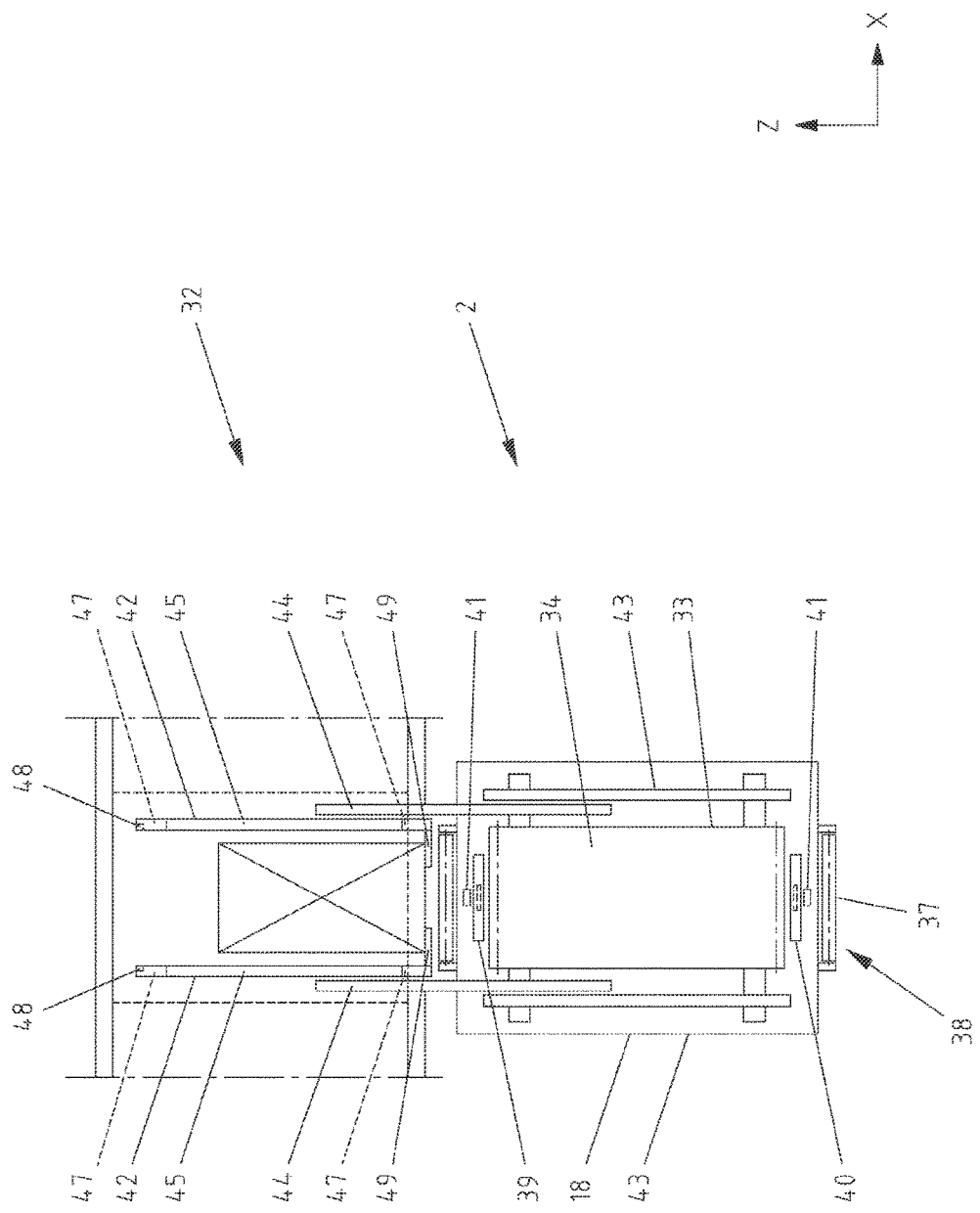

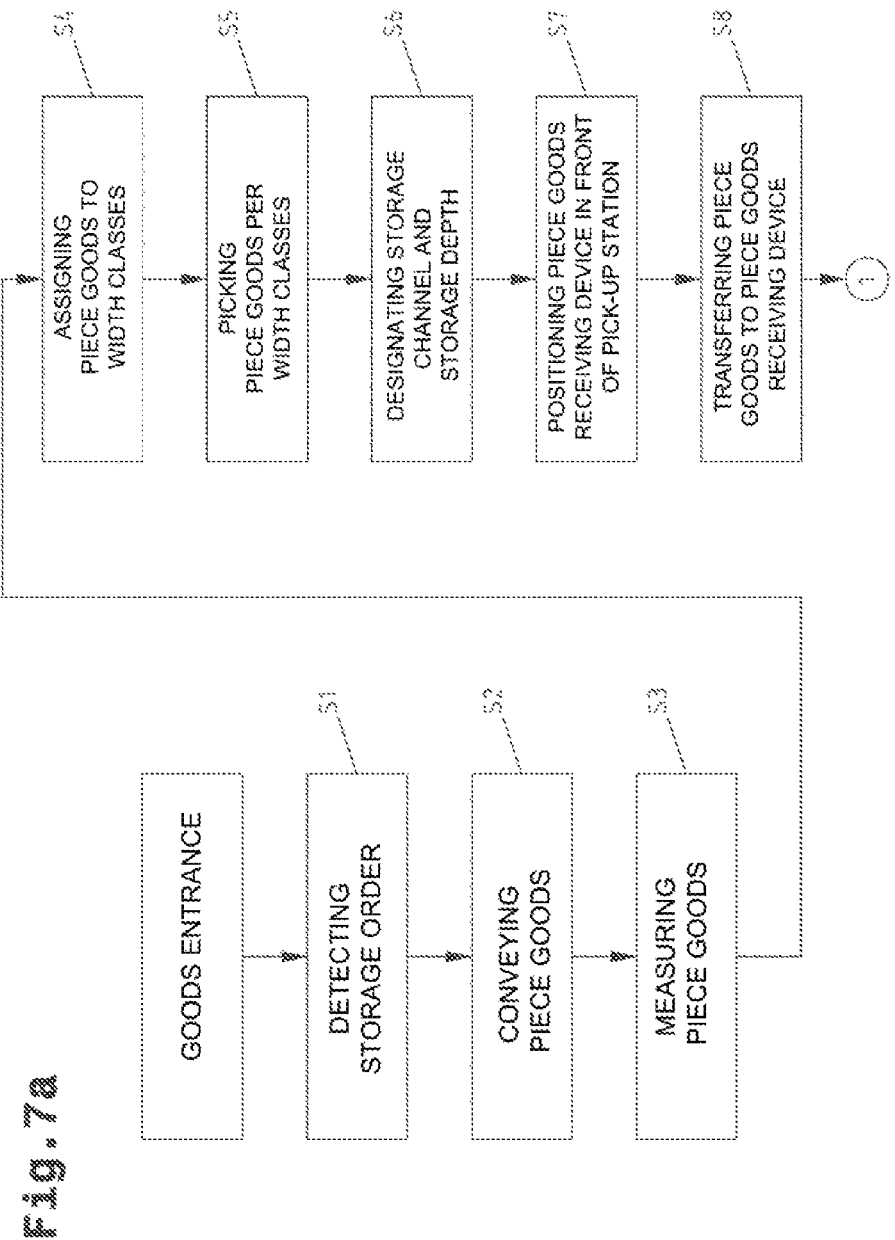

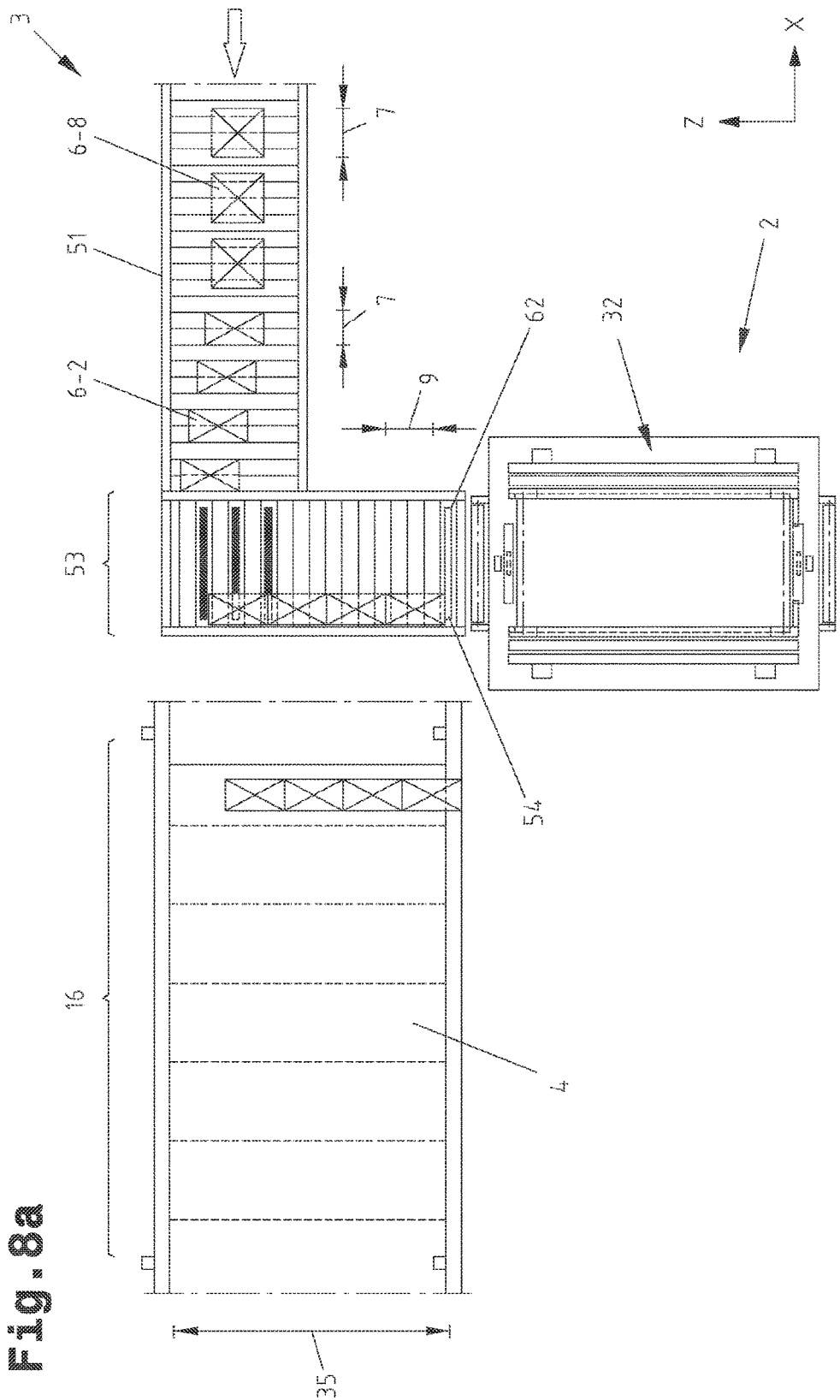

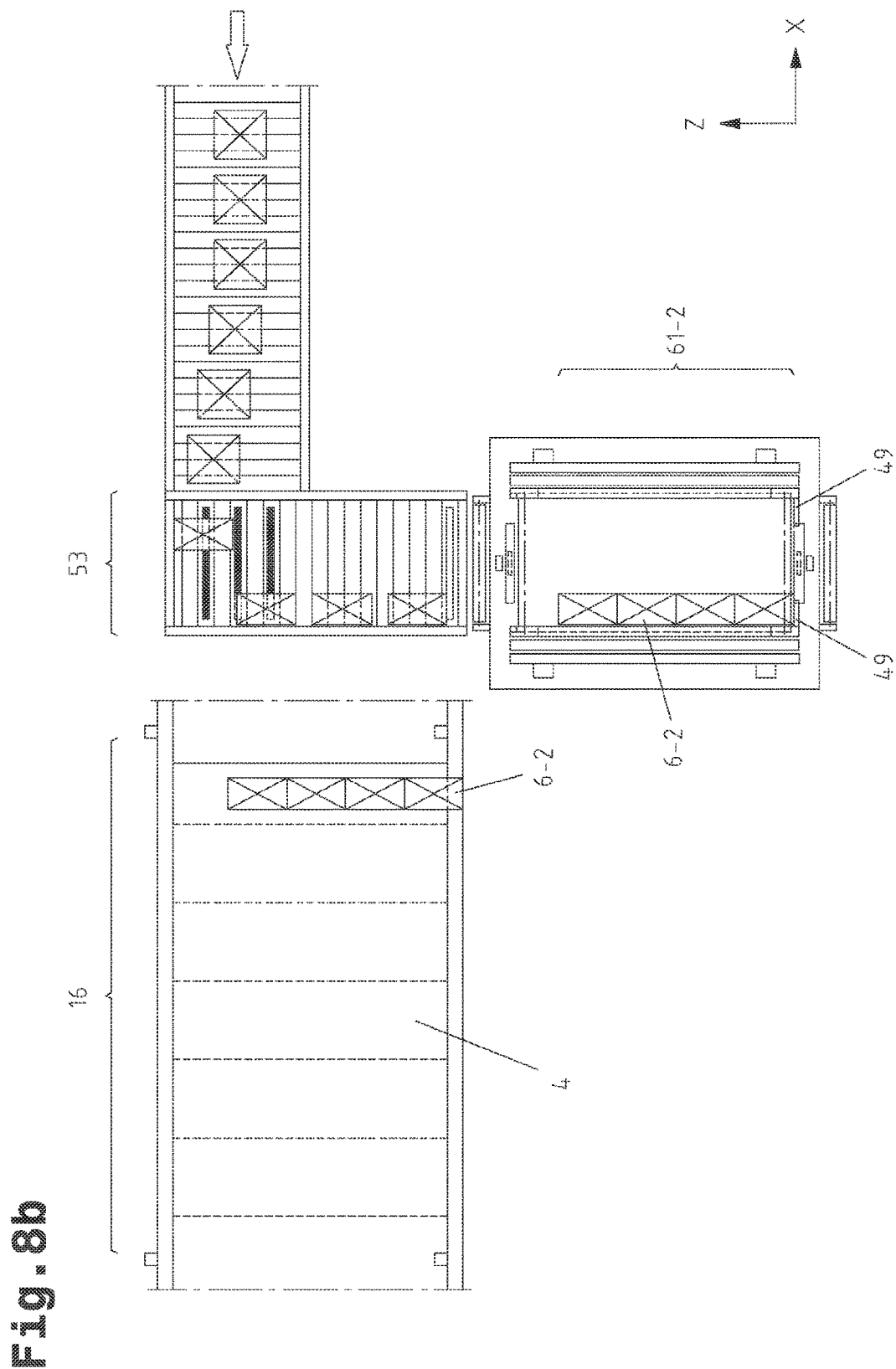

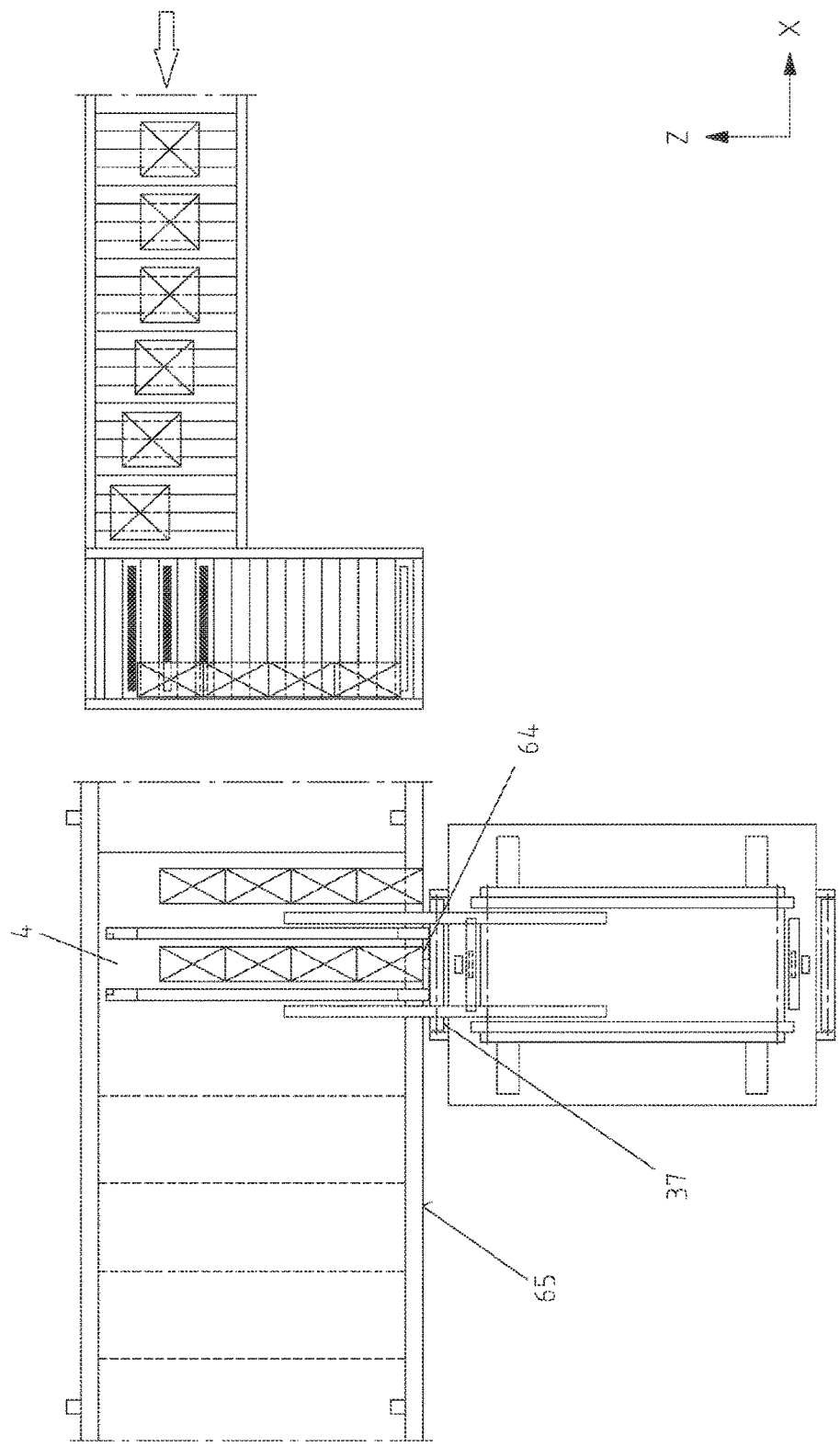

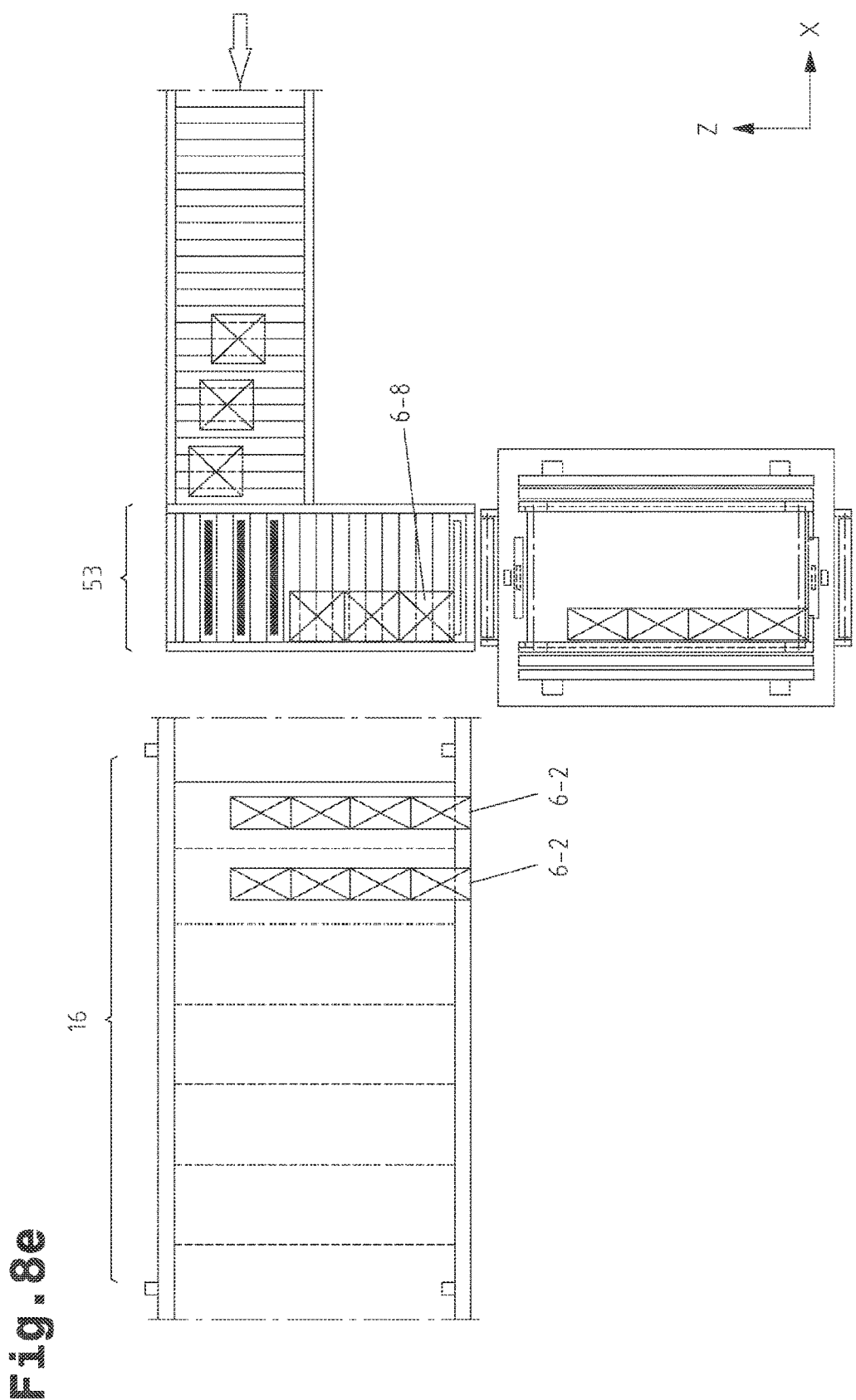

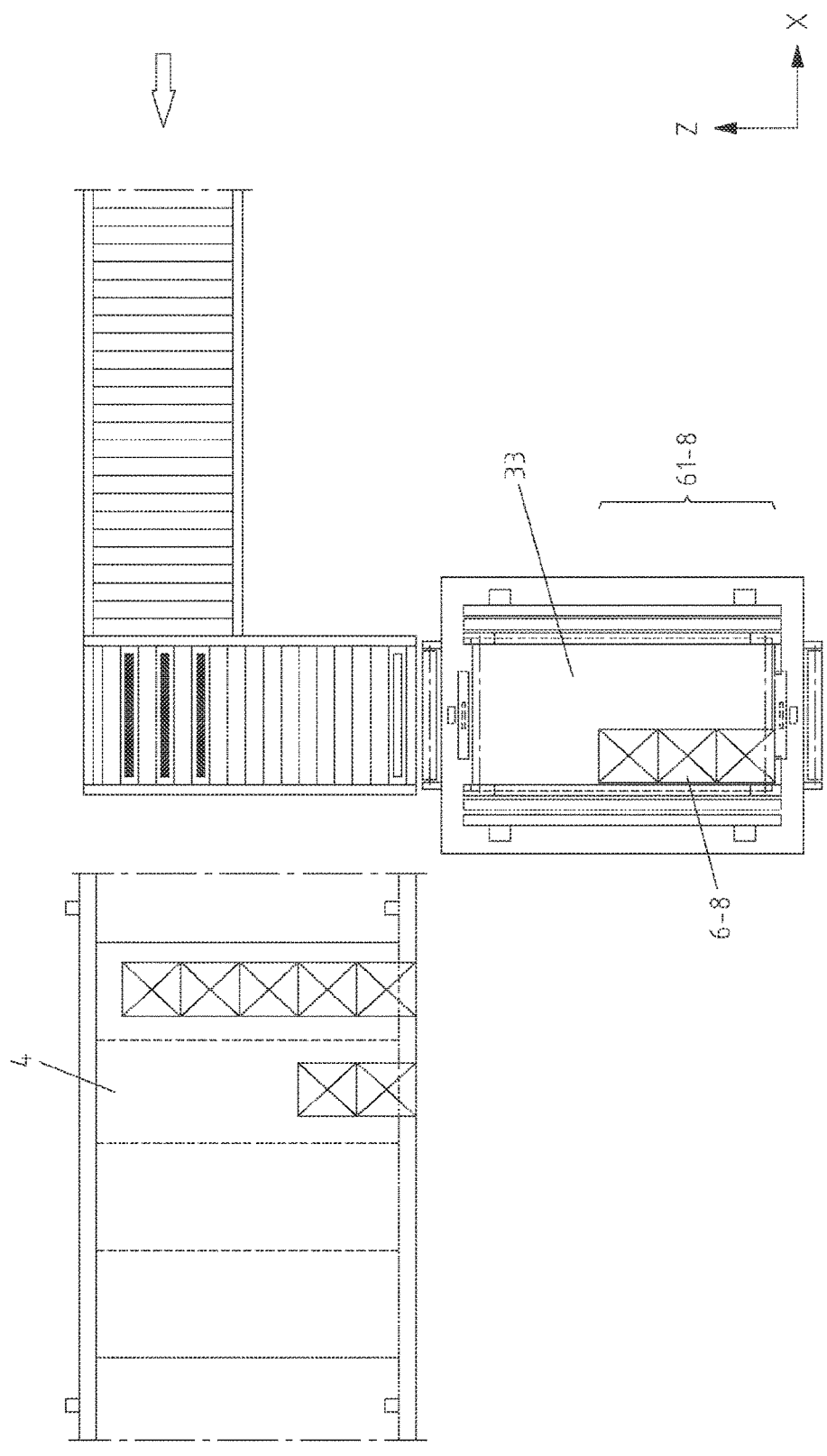

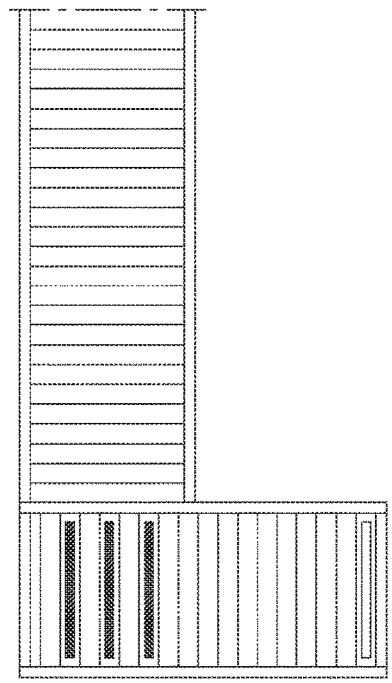
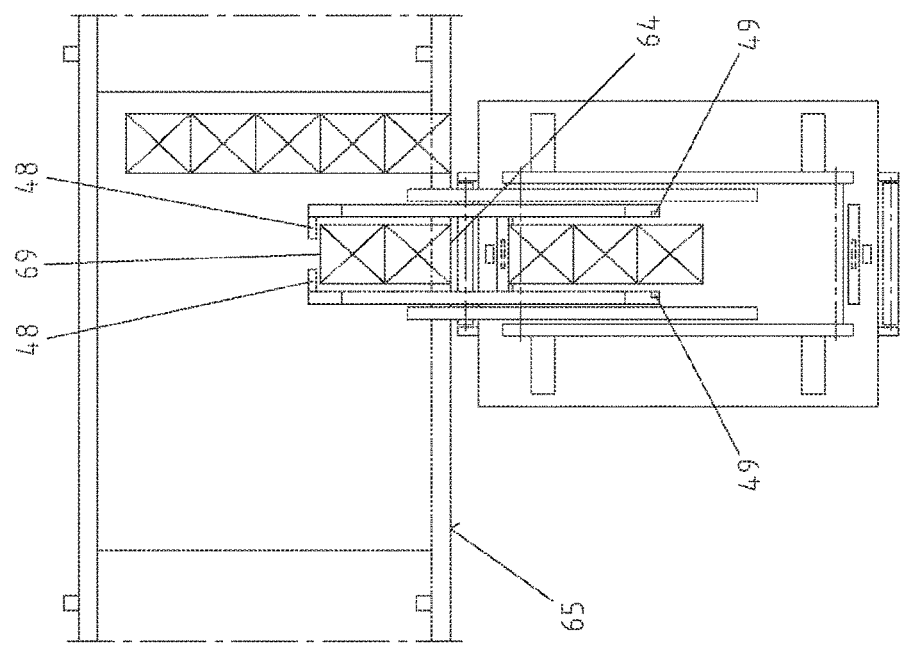
Fig. 9c

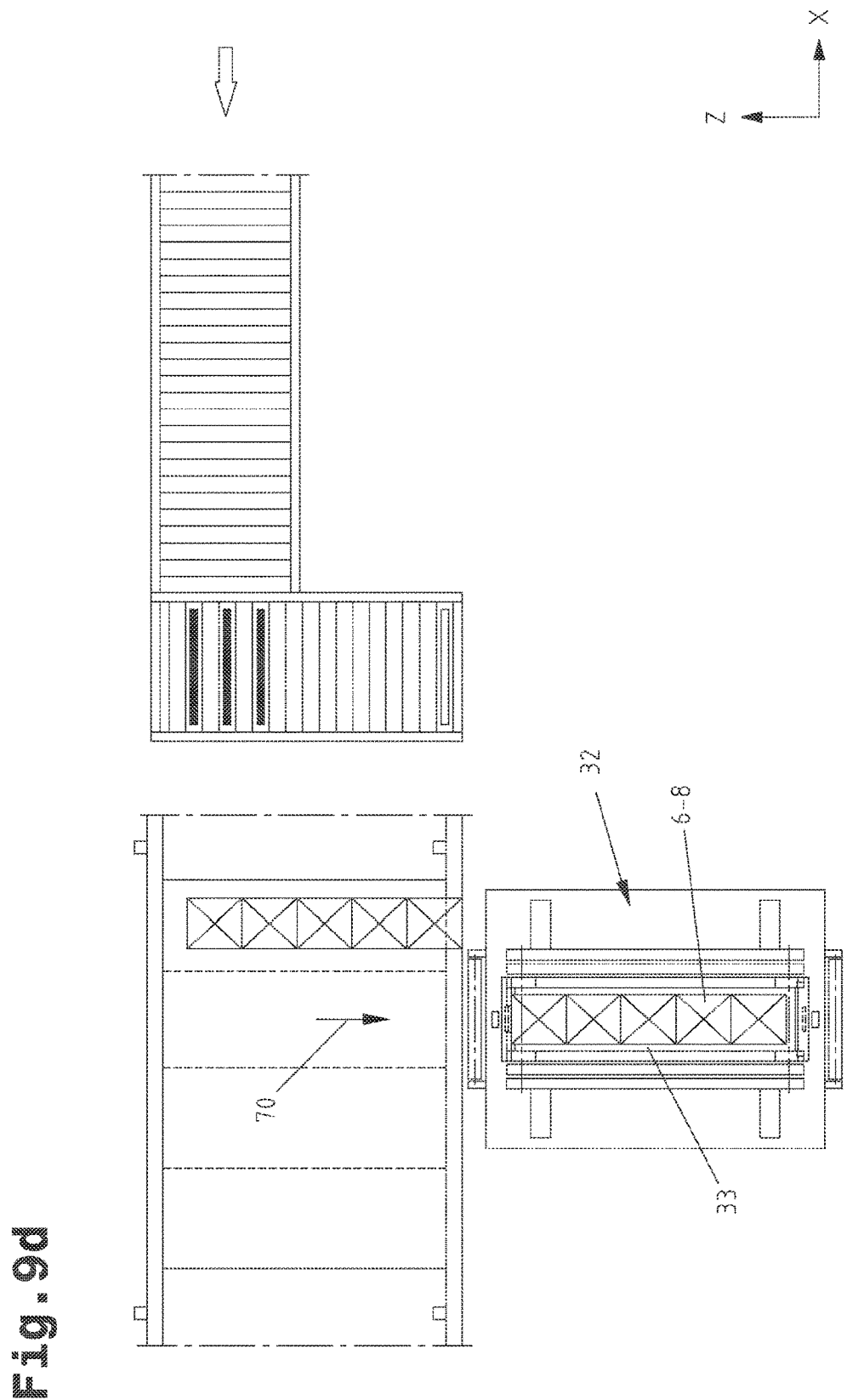

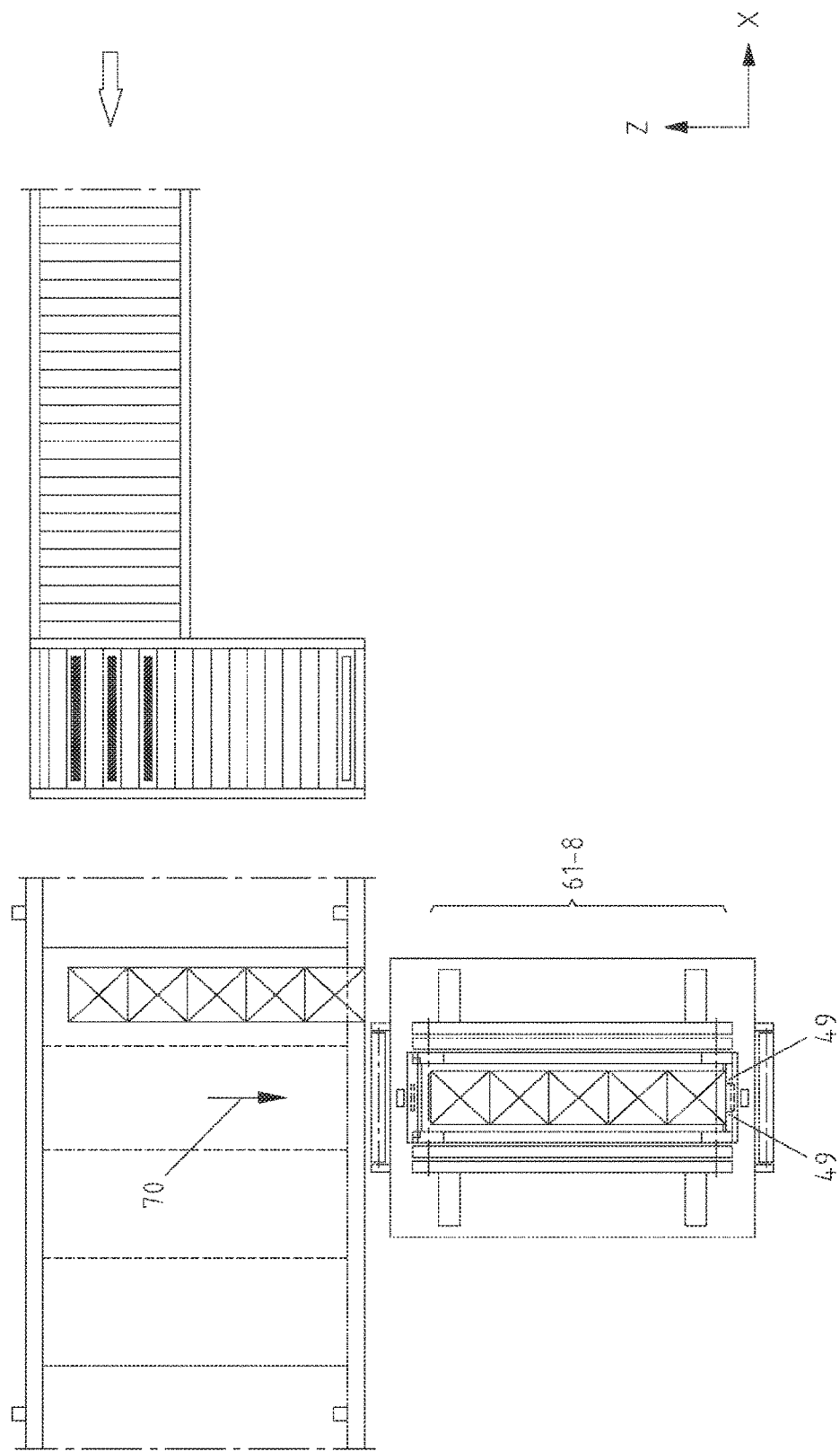

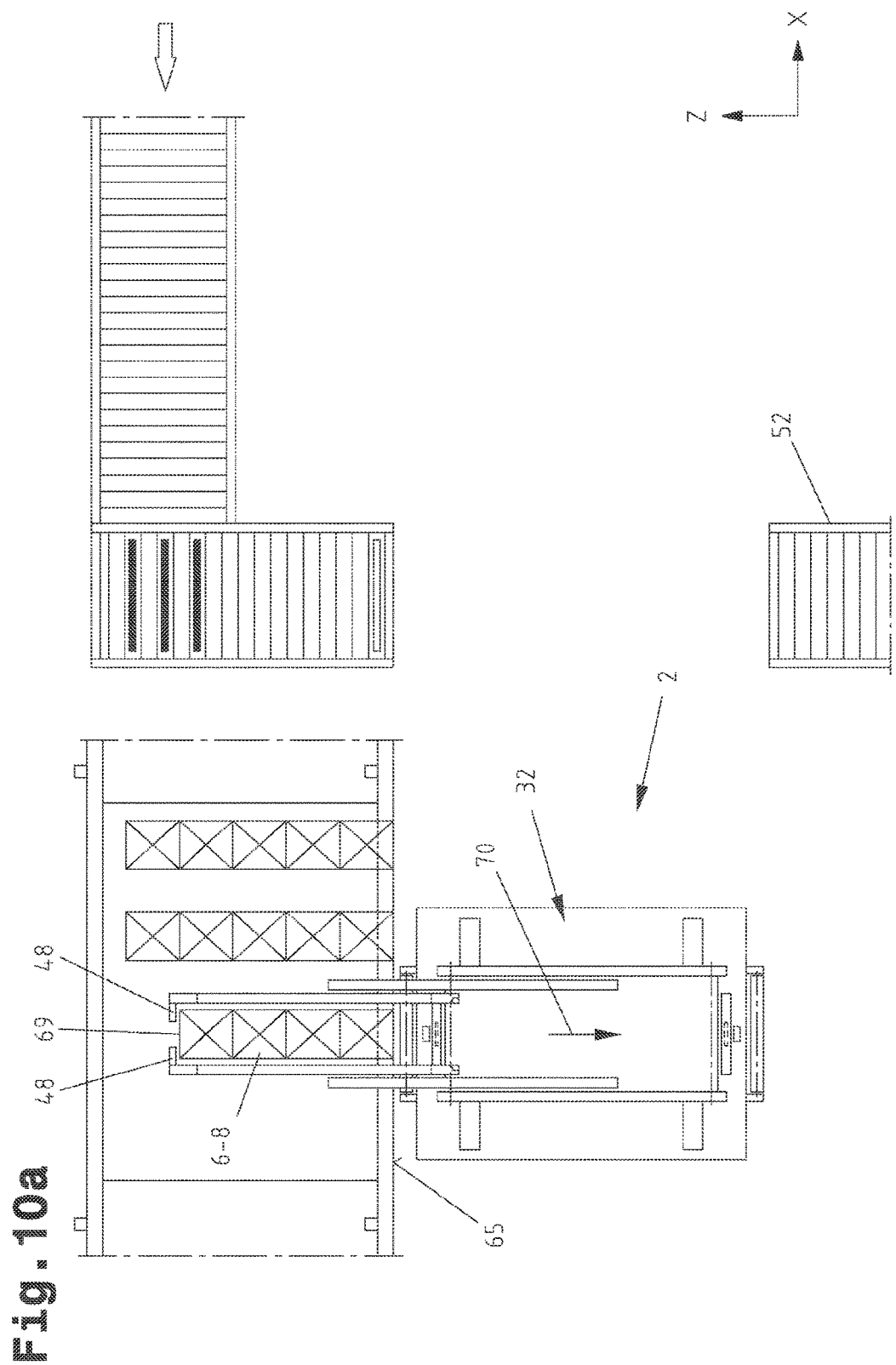

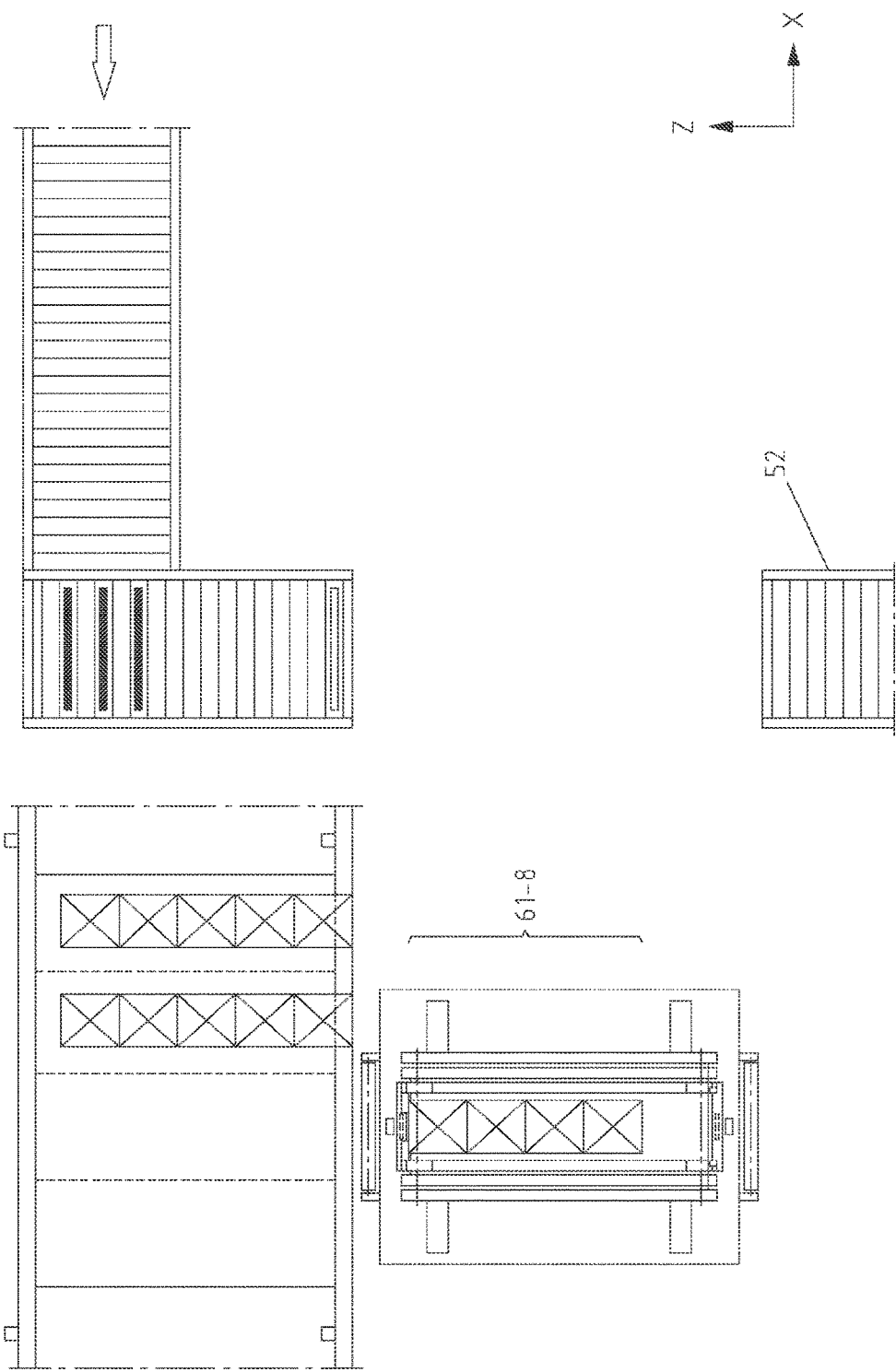

METHOD FOR STOCKPILING PIECE GOODS IN A STORAGE RACK, AND STORAGE SYSTEM

CROSS REFERENCE TO RELATED APPLICATIONS

This application is the National Stage of PCT/AT2016/050034 filed on Feb. 19, 2016, which claims priority under 35 U.S.C. § 119 of Austrian Application No. A 50179/2015 filed on Mar. 6, 2015, the disclosure of which is incorporated by reference. The international application under PCT article 21(2) was not published in English.

The invention relates to a method for storing piece goods of different dimensions in storage channels of a storage rack having a plurality of storage channels, whereby the piece goods are conveyed to the storage channels by means of a piece goods receiving device which can be moved along the storage rack in a first direction (x-direction) and into the storage channels by means of a transport device which can be extended out from the piece goods receiving device into the storage channel in a second direction (z-direction), and the piece goods are stored in the storage channels one against the other in a tightly packed manner.

The method comprises the steps:
- detecting, by means of a control unit, at least one width dimension of the piece goods, which width dimension extends transversely to the longitudinal extension of the storage channel when the piece good has been stored in the storage channel,
- designating width classes and assigning the piece goods to the respective width classes by the control unit,
- feeding the piece goods in a selective manner according to width class to at least one pick-up station by means of a conveying system,
- designating at least one (empty) storage channel from a number of storage channels and a storage depth in the designated storage channel in which piece goods of a single width class should be stored,
- positioning the piece goods receiving device in front of the pick-up station,
- transferring to the piece goods receiving device those piece goods of this width class which should be stored in the designated storage channel,
- lining up the piece goods on the piece goods receiving device one against the other in a tightly packed manner to form a group of piece goods,
- positioning the piece goods receiving device in front of the designated storage channel,
- moving the group of piece goods from the piece goods receiving device into the (empty) storage channel by means of the transport device such that the piece goods are simultaneously moved in a first direction of movement (storage direction) and in the depth direction of the storage channel to such a degree that the lateral wall of the rearmost piece good in the direction of movement (storage direction) is substantially flush with an end edge of the storage channel.

The invention further relates to a storage system for implementing the method.

EP 2 234 904 A1 discloses a method for storing loading aids by means of a transport device in a storage channel with setting-down locations arranged one behind the other for piece goods of uniform length and width dimensions. In this instance, a first piece good is conveyed by the transport device into the storage channel to the front storage space in the storage direction. A second piece good is then moved by the transport device into the storage channel to the front storage space so that the first piece good is moved in the storage direction to the storage space lying behind and the second piece good is moved to the front storage space so that the piece goods are set down in the storage channel one against the other in a tightly packed manner. The transport device has driving elements for the storage operation and transport elements for the retrieval operation.

EP 2 393 735 A1 discloses a transport device for storing loading aids, by means of which piece goods of different length and width dimensions can be manipulated. The storage channels have bottom plates with ribs, on the projecting ribs of which the piece goods can be deposited in different depth positions.

U.S. Pat. No. 8,594,835 B2 discloses an automatic storage system with storage racks having an array of storage channels and a plurality of piece goods receiving devices (shuttles) for each rack level which can be moved along guide rails in a first direction (x-direction). The piece goods receiving devices are each provided with a transport device which can be extended in a second direction (z-direction) into the storage channel. The piece goods receiving devices and transport devices are activated by a control unit. The storage channels are able to accommodate piece goods of different dimensions.

JP 2005219832 A, JP 2000118639 A and JP 2008143660 A disclose a storage system having a storage rack with a plurality of storage channels and although the storage channels are able to accommodate piece goods of differing widths, there is only a single piece good (W) in a storage channel in the second direction (z-direction). The available ranges of piece goods are divided into width classes and the piece goods of a first width class are stored next to one another and one deep on a first rack level and the piece goods of a second width class are stored next to one another and one deep on a second rack level, etc.

EP 2 543 446 A1 discloses an automatic panel sorter comprising a storage rack with a plurality of storage channels and a piece goods receiving device which can be moved along the storage rack. The piece goods receiving device is equipped with a transport device for storing glass panels in a storage channel or retrieving them from a storage channel. The transport device is only capable of accommodating one glass panel. If a storage channel is already taken up by a glass panel, the shelf depth which still remains free is computed by subtraction from the total shelf depth and a glass panel of the same or a smaller length is directed to the already partially occupied shelf space by the control system.

DE 10 2004 046 176 A discloses an automatic storage system comprising a storage rack with a plurality of storage channels, a loading device for loading trays and piece goods receiving devices which can be moved along the storage rack in a first direction (x-direction). The piece goods receiving devices are each equipped with a transport device which can be extended in a second direction (z-direction) into the storage channel. The piece goods are conveyed by a conveyor belt to the loading device, where they are transferred from the conveyor belt to the tray by a jaw gripper. The piece goods are set down next to one another in several rows (R1, R2) on the tray and piece goods are only set down within a row if a bounding rectangle of this row does not overlap a bounding rectangle of the next row. The piece goods can then be picked up from the tray by means of the transport device, individually or as a row, and distributed to the storage channels.

EP 1 627 830 A1 discloses a method of the generic type for storing piece goods of different dimensions in storage channels of a storage rack having a plurality of storage channels, comprising the steps:
- detecting at least one width dimension of the piece goods,
- designating width classes and allocating the piece goods to the respective width classes,
- designating at least one storage channel in which the piece goods of a single width class should be stored,
- supplying the piece goods via a conveying system to at least one pick-up station,
- positioning the piece goods receiving device in front of the pick-up station,
- transferring to the piece goods receiving device those piece goods of this width class which should be stored in the designated storage channel,
- positioning the piece goods receiving device in front of the designated storage channel,
- moving the group of piece goods from the piece goods receiving device into the storage channel.

The underlying objective of this invention is to propose a method for storing piece goods of different dimensions, whereby optimal use is made of the available storage capacity (high storage ratio) and at least a high storage efficiency is achieved. In particular, it is also an objective of the invention to enable the storage operation and/or the "filling up" of a partially filled storage channel with additional piece goods to be run reliably.

The objective of the invention is achieved by means of the following method features:
- designating at least one (partially filled) storage channel from a number of storage channels in which one piece good of a width class or several piece goods of a single width class is/are already being temporarily stored,
- determining, by the control unit, a storage depth in the designated storage channel which remains free after deduction of the length dimension of the temporarily stored piece good or temporarily stored piece goods,
- determining, by the control unit, the piece goods which can be additionally stored in the designated storage channel for this width class,
- transferring to the piece goods receiving device those piece goods which can be additionally stored in the designated storage channel for this width class,
- lining up an individual piece good on the piece goods receiving device or several piece goods on the piece goods receiving device one against the other in a tightly packed manner to form a group of piece goods,
- positioning the piece good or group of piece goods on the piece goods receiving device by means of a conveyor device comprising the piece goods receiving device,
- positioning the piece goods receiving device in front of the designated storage channel,
- moving a piece good already disposed in the storage channel or a group of piece goods already disposed in the storage channel from the storage channel onto the piece goods receiving device by means of the transport device such that the piece good or group of piece goods is moved in a second direction of movement (retrieval direction),
- aligning and positioning the piece goods (6) on the piece goods receiving device (2) so that the piece good (6) or group of piece goods (61) on the piece goods receiving device (2) and the piece good (6) or group of piece goods (61) from the storage channel (4) lie one against the other in a tightly packed manner and are positioned relative to one another in a direction extending transversely to the longitudinal extension of the storage channel,
- moving the resultant group of piece goods from the piece goods receiving device into the storage channel by means of the transport device such that the piece goods are simultaneously moved in a first direction of movement (storage direction) and to such a degree in the depth direction of the storage channel that the lateral wall of the rearmost piece good in the direction of movement (storage direction) is substantially flush with an end edge of the storage channel.

The objective of the invention is also achieved by a storage system of the aforementioned type, and the control unit is configured to:
- designate at least one storage channel from a number of storage channels in which a piece good of a width class or several piece goods of a single width class are already being temporarily stored,
- determine a storage depth in the designated storage channel which remains free after deducting the length dimension of the temporarily stored piece good or temporarily stored piece goods,
- determine the piece goods which can be additionally stored in the designated storage channel for this width class,
- control the conveying system and/or the piece goods receiving device in order to transfer to the piece goods receiving device those piece goods which can be additionally stored in the designated storage channel for this width class, a piece good or several of the piece goods on the piece goods receiving device being lined up one against the other in a tightly packed manner to form a group of piece goods,
- control the piece goods receiving device or the transport device in order to position the piece good (6) or group of piece goods (61) in a direction extending transversely to the longitudinal extension of the storage channel,
- control the piece goods receiving device in order to position it in front of the designated storage channel,
- control the piece goods receiving device and/or the transport device in order to move a piece good already disposed in the storage channel or a group of piece goods already disposed in the storage channel from the storage channel onto the piece goods receiving device by means of the transport device such that the piece good or group of piece goods is moved in a second direction of movement (retrieval direction),
- control the piece goods receiving device and/or the transport device in order to align the piece goods on the piece goods receiving device one after the other in a row so that the piece good or group of piece goods on the piece goods receiving device and the piece good or group of piece goods from the storage channel lie one against the other in a tightly packed manner and are positioned relative to one another,
- control the piece goods receiving device and/or the transport device in order to move the resultant group of piece goods from the piece goods receiving device into the storage channel by means of the transport device such that the piece goods are moved simultaneously in a first direction of movement (storage direction) and to such a degree in the depth direction of the storage channel that the lateral wall of the rearmost piece good in the direction of movement (storage direction) is substantially flush with an end edge of the storage channel.

As a result of these method features, a partially filled storage channel can be reliably "filled up" with additional piece goods and the availability of the storage system increased. During off-peak times, it may be preferable to reorganize piece goods that have already been placed in the storage system or to top up piece goods that have already been stored in the storage system. In the case of reorganizing piece goods, a piece good or a (partial) group of piece goods from another storage channel in which a piece good or a (partial) group of piece goods is being stored is transferred to the piece goods receiving device. In the case of topping up piece goods, a piece good or several piece goods are taken from the pick-up station and the several piece goods are arranged on the piece goods receiving device as a (partial) group of piece goods. The piece goods are aligned one after the other in a tightly packed arrangement to form a full group of piece goods on the piece goods receiving device by means of the conveyor device (belt conveyor) and/or transport device. The transport device can then make up a full group of piece goods from the individual piece goods and convey this full group of piece goods into a storage channel. The piece goods thus belong to one width class. In other words, "partially filled" storage channels are "filled up" and the storage ratio is thus optimized.

Irrespective of the above, it has been found in practice that the piece goods in the storage channels shift from their storage positions as the travel speeds of the piece goods receiving device increase. This is firstly due to vibrations induced in the storage rack and secondly because of turbulent air flows generated by the piece goods receiving device during travel. Allowance also has to be made for inaccurate positioning of the piece goods receiving device when repeatedly approaching a storage channel. For this reason, it is of advantage if the piece good or piece goods located in a storage channel in which a piece good or a (partial) group of piece goods additionally has/have to be stored are firstly retrieved from the storage channel and moved onto the piece goods receiving device in order to make up a "full" group of piece goods. The "full" group of piece goods is positioned on the piece goods receiving device so that the piece goods are also oriented against one another in particular in a direction extending transversely to the longitudinal extension of the storage channel before being moved back into the storage channel. However, this seemingly complex method feature has a decisive advantage because there is no need to provide the piece goods receiving device with additional sensors for detecting a storage position of the piece goods, which could otherwise be susceptible to faults. Nor is there any need for complex evaluation analyses. Furthermore, larger (partial) groups of piece goods with a plurality of smaller piece goods on the piece goods receiving device can now be brought together with larger (partial) groups of piece goods with a plurality of smaller piece goods in the storage channel without causing skewing when jointly moving the piece goods from the piece goods receiving device into the storage channel.

Designating width classes and assigning the piece goods to the respective width classes as well as transporting groups of piece goods have proved to be of advantage because the number of operations needed to position the piece goods receiving device relative to the pick-up station on the one hand and relative to the storage channel in which the piece goods of a width class are to be stored on the other hand can be significantly reduced. This is all the more so, the greater the number of different width dimensions there are for the piece goods. If the piece goods vary in width dimension within a predefined width range, these piece goods are not transferred to the piece goods receiving device and stored separately in each case but are assigned to a width class and selectively conveyed to the pick-up station accordingly. This being the case, the piece goods of this width class are transferred to the piece goods receiving device. The piece goods are therefore assembled on the piece goods receiving device to form a group of piece goods. This group of piece goods is then moved into a storage channel. It is only if the number of piece goods in this width dimension is greater than the number that can be accommodated in the storage channel in the depth direction that the piece goods receiving device will carry out a first storage operation in a first storage channel and then carry out a second storage operation at a second storage channel. Accordingly, compared with such storage systems known from the prior art, significantly higher storage efficiency can be achieved for more or less the same range of piece goods and if piece goods of the same width dimension are always to be stored in one storage channel. Reducing the number of positioning operations of the piece goods receiving device also means less stress on mechanical parts, increasing the availability of the storage system. If the range of piece goods contains piece goods of the same width dimension and in a high quantity, the latter are assigned to a width class and are respectively lined up as a group of piece goods one against the other in a tightly packed manner on the piece goods receiving device and then moved one after the other as groups of piece goods into a plurality of storage channels. This group of piece goods preferably forms a single row of piece goods oriented in the z-direction.

The storage rack is configured to accommodate piece goods of different dimensions. For example, the storage channels are disposed on storage shelves, which might be solid shelves, wire mesh shelves and such like. There is no set pattern in which the piece goods must be deposited in the storage rack. Instead, an x-spacing between the groups of piece goods can be predefined by the control unit depending on the width class for the piece goods. As may be seen, optimum use can now be made of the available storage surfaces in both the x-direction and the z-direction. This therefore results in a high storage ratio.

Organization of the warehouse can be simplified and the complexity of the control system can be reduced if the storage rack on one rack level defines a first storage zone with a plurality of first storage channels and a second storage zone with a plurality of second storage channels, and the first storage zone is used to store groups of piece goods comprising piece goods of the first width class and the second storage zone is used to store groups of piece goods comprising piece goods of the second width class, as defined in claim 2.

Taking the first storage zone, piece goods each having the same width dimensions (for example 300 mm) can now be stored within a selected (first) storage channel. These piece goods may also each be of the same length dimensions (for example 400 mm). Piece goods which have at least the same width dimensions (for example 300 mm) as the piece goods in the selected (first) storage channel are then preferably stored in the other (first) storage channels of the first storage zone. These piece goods may likewise in turn be of the same length dimensions (for example 400 mm) as the piece goods in the selected (first) storage channel. The advantage of such a storage system is that within a storage channel, the same articles can also be stored. If the article is a shirt, for example, only shirts will be stored in a storage channel which will additionally accommodate all articles of the same type. For example, in the selected (first) storage channel, shirts of the X-Large size and color white will be stored. The same articles, for example a shirt, will likewise be stored in the other (first) storage channels, which may either be of the same article type or a different article type. For example, in another (first) storage channel, the shirt of size Large and color white may be stored, etc.

Turning to the second storage zone, piece goods each having the same width dimension (for example 500 mm) can now be stored within a selected (second) storage channel. These piece goods may also each be of the same length dimension (for example 700 mm). Piece goods which have at least the same width dimension (for example 500 mm) as the piece goods in the selected (second) storage channel are then preferably stored in the other (second) storage channels of the second storage zone. These piece goods may likewise in turn be of the same length dimension (for example 700 mm) as the piece goods in the selected (second) storage channel. The advantage of such a storage system is that within a storage channel, the same articles can also be stored. If the article is a pullover, for example, only pullovers will be stored in a storage channel which will additionally accommodate all articles of the same type. For example, in the selected (second) storage channel, pullovers of the X-Large size and color white will be stored. The same articles, for example a pullover, will likewise be stored in the other (second) storage channels, which may either be of the same article type or a different article type. For example, in another (second) storage channel, the pullover of size Large and color white may be stored, etc.

As may be seen, however, the piece goods of the first storage zone differ from the piece goods of the second storage zone in terms of at least the width dimensions. Optionally, the length dimension of the piece goods of the first storage zone may also differ from the length dimension of the piece goods of the second storage zone.

A feature defined in claim 3 is of advantage because piece goods of "inferior" packaging quality can also be reliably conveyed and stored. Ever growing attempts are being made to use cheaper packaging material, which means poorer packaging quality. It must be assumed that the piece goods might be deformed to a greater or lesser degree. In order to deal with this, the piece goods are measured, in particular an actual width dimension and optionally an actual length dimension is determined, and the control processes for the transport device and/or conveying system are adapted accordingly. For example, due to deformation of a piece good, the width dimension and/or length dimension may vary from a theoretical width dimension and/or length dimension. If the width dimension has changed, this piece good is assigned to another width class and selectively fed to the pick-up station with the piece goods of this width class.

If the actual length dimension is bigger than a target length dimension, it is possible that only a reduced number of piece goods can be stored in a storage channel. In this case, the conveying system is activated by the control unit in such a way that only the "reduced" number of piece goods of a width class is fed to the pick-up station. The same applies to the transport device. If the length dimension has changed, the distance by which the transport device is extended in the z-direction is also adapted by the control unit. If the actual length dimension is smaller than a target length dimension, the extension distance when storing the groups of piece goods of this width class is also shorter.

The feature defined in claim 4 takes account of the actual length dimension of the piece goods due to shape deviations. If the actual length dimension is bigger than a target length dimension, it is possible that only a reduced number of piece goods can be stored in a storage channel. If, on the other hand, the actual length dimension is smaller than a target length dimension, a greater number of piece goods can be stored in a storage channel. The extension distance of the transport device is then individually adapted by the control unit.

As specified in claim 5 and 15 or 22, the transfer of piece goods to the piece goods receiving device is monitored, thereby preventing incorrect storage. If the measurement indicates a deviation of the actual length for the group of piece goods that was transferred to the goods receiving device from the target length for the group of piece goods that should be transferred to the piece goods receiving device, a monitoring signal is triggered. In this case, a manual intervention in the automated operation may be necessary.

The piece goods within the group of piece goods are oriented one against the other before being conveyed into the storage channel, as specified in claim 6. The transport device is preferably used for this purpose, in particular telescopic units that can be displaced relative to one another in the x-direction. However, it would also be possible to provide an additional orienting device which is a part of the piece goods receiving device. This ensures that the group of piece goods is stored sufficiently accurately in the storage channel to enable a subsequent retrieval operation to be reliably implemented.

As specified in 7, the group of piece goods is also positioned in the z-direction, thereby ensuring that the lateral wall of the rearmost piece good of the group of piece goods in the direction of movement (storage direction) extends exactly flush with an end edge of the storage channel. The group of piece goods is positioned by means of the conveyor device (belt conveyor), whereby the group of piece goods is moved against the transport element(s) disposed at a distance apart in the storage direction or the stop element at a distance apart in the storage direction.

It has also proved to be of advantage if the following steps are implemented in order to retrieve piece goods from one of the storage channels:

positioning the piece goods receiving device in front of the storage channel from which one or more piece goods are to be retrieved, moving individual piece goods or the group of piece goods from the storage channel onto the piece goods receiving device by means of the transport device such that the transport device moves all of the piece goods disposed in the storage channel simultaneously in a second direction of movement (retrieval direction) and out of the storage channel to the degree that the desired number of piece goods or the group of piece goods is/are positioned on the piece goods receiving device.

Individual piece goods or preferably a group of piece goods is retrieved from a storage channel. If a number of articles of the same type are needed for a customer order, for example the same shirts in different sizes and/or colors, a retrieval order may consist of a number of piece goods of the same type. This being the case, the piece goods receiving device may move alongside the storage channels respectively containing the piece goods of the same type one after the other, retrieve a group of piece goods by means of the transport device each time and then convey it to the conveying system. This results in high retrieval efficiency. It has also proved to be of particular advantage if the distance by which the transport device is extended is controlled by the control unit independently of the (measured) actual values of the length dimension of the piece goods.

This enables a storage system to be obtained which operates with a high throughput (number of storage operations and retrieval operations per unit of time) and at maximum efficiency.

The embodiment defined in claim 10 or 17 is also of advantage because the piece goods receiving device is of a particularly simple yet highly functional design. The transport device comprises transport elements disposed exclusively in the end regions of the second rail which can be moved between the initial position and an operating position. Accordingly, the transport elements can be moved together with the telescopic units in the x-direction or the transport elements can be moved relative to the second rail. The conveyor device is preferably stationary and enables the piece goods to be positioned in the z-direction.

The piece goods receiving device may also comprise a supporting means in the end regions of the conveyor device, as defined in claim 11 or 18. As a result of this feature, it is then possible to move piece goods having a particularly short length dimension between the piece goods receiving device and the storage channel, for example in the order of 150 mm.

As specified in 12 or 19, the supporting means is a motorized conveyor device so that a driving force can be applied to the piece goods from underneath as the piece goods are moved between the piece goods receiving device and the storage channel, which has proved to be of particular advantage in the case of heavy piece goods.

The embodiment defined in claim 13 or 20 is of advantage because a wide range of piece goods can be handled, namely piece goods of small width dimensions/length dimensions and piece goods of large width dimensions/length dimensions.

The piece goods receiving device may also comprise a stop element in the end regions of the conveyor device, as specified in claim 14 or 21. As a result of this feature, it is now possible for piece goods having a particularly short width dimension, for example in the order of 200 mm, to be positioned on the piece goods receiving device.

To provide a clearer understanding, the invention will be described in more detail below with reference to the appended drawings.

Figure 2:
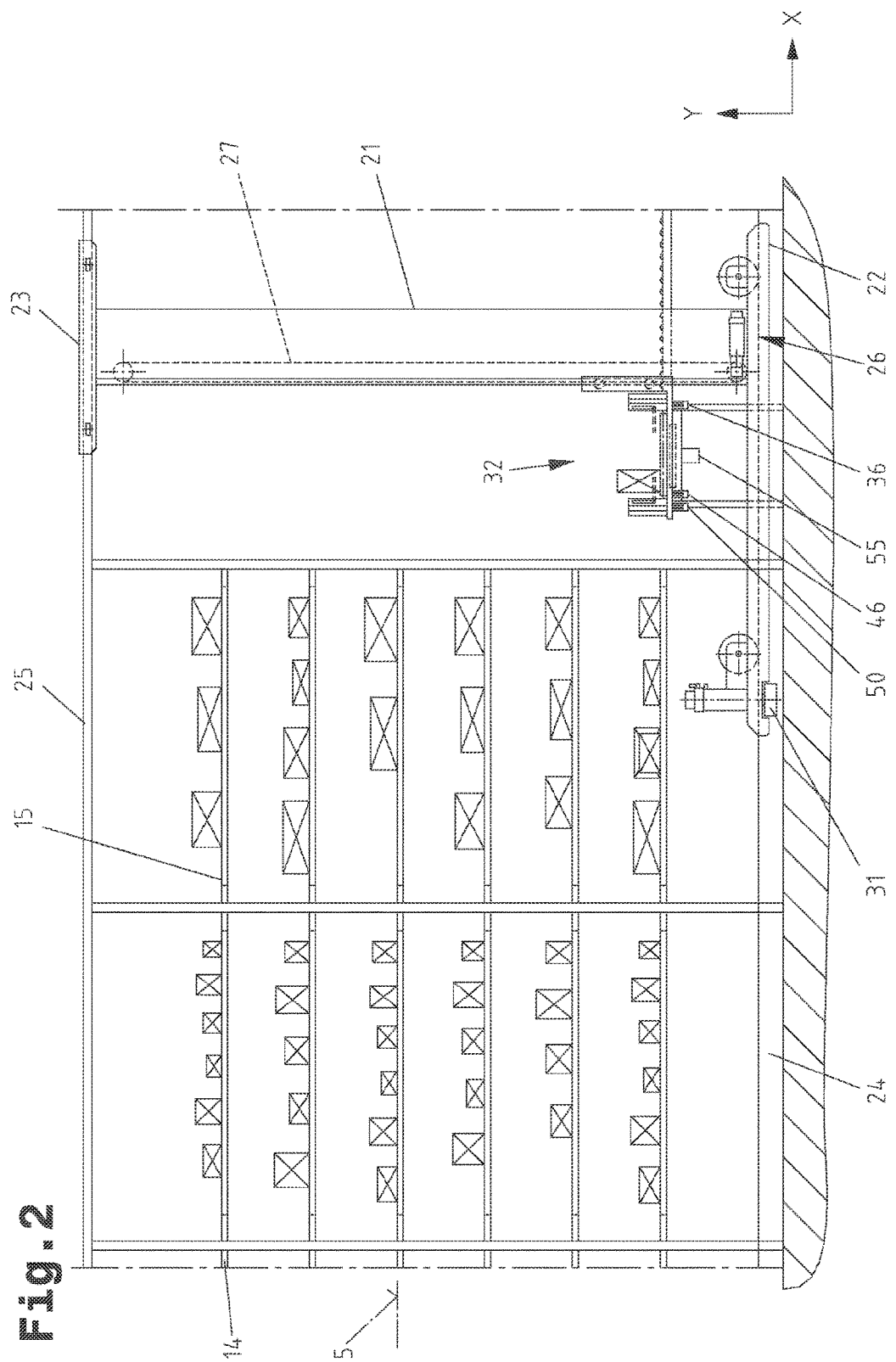
Figure 5:
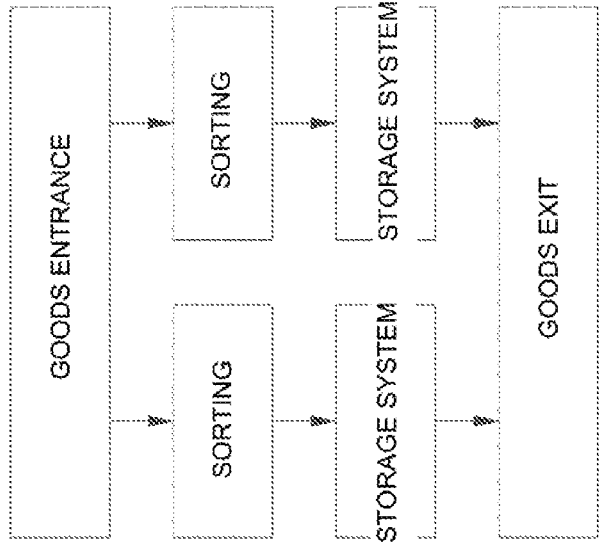
Figure 4:
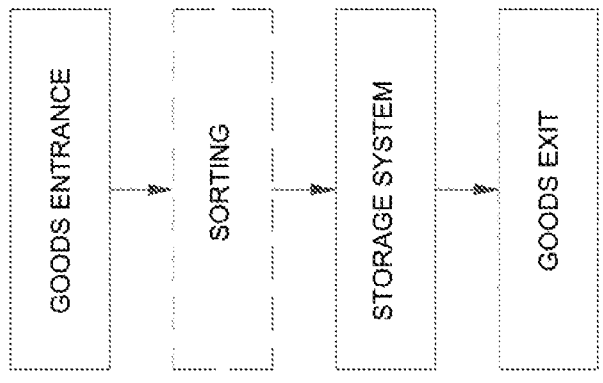
Figure 6:
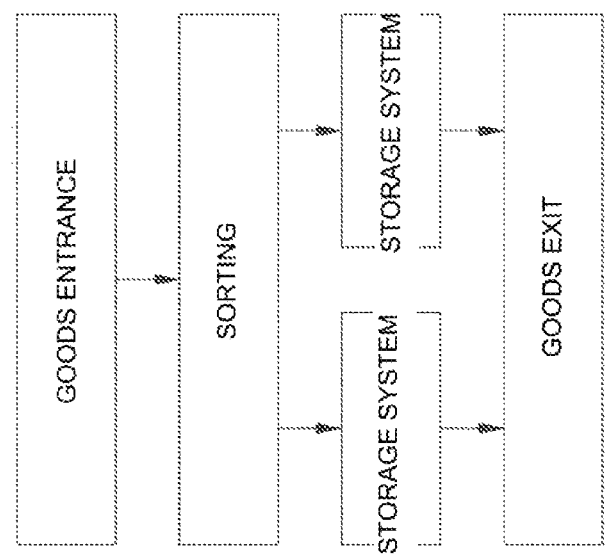
Figure 7B:
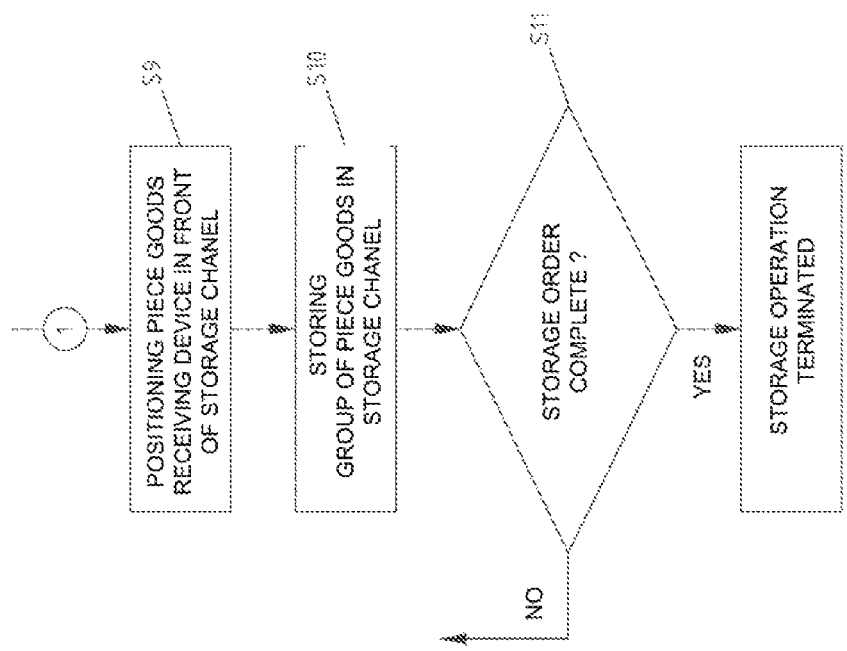

These are highly simplified, schematic diagrams illustrating the following:

FIG. 1 a plan view of a lowermost rack level of part of a storage system having storage racks and a piece goods receiving device;

FIG. 2 a view along line II of the storage system illustrated in FIG. 1;

FIG. 3 a transport device for storing piece goods in a storage channel and/or retrieving piece goods from a storage channel in a plan view onto part of a rack level;

FIG. 4 a block diagram illustrating a first implementation of a storage system;

FIG. 5 a block diagram illustrating a second implementation of a storage system;

FIG. 6 a block diagram illustrating a third implementation of a storage system;

FIG. 7a, 7b a flow chart illustrating a storage operation;

FIGS. 8a to 8e a sequence diagram for a storage operation of piece goods of a width class;

FIGS. 9a to 9f a sequence diagram for a storage operation of piece goods in a storage channel in which two piece goods have already been placed in the storage channel of a width class;

FIG. 10a, 10b a sequence diagram for a retrieval operation of piece goods of a width class.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Furthermore, in order to retain better clarity in FIGS. 8a-8e, 9a-9f and 10a-10b, only one of the storage racks and the storage/retrieval operation for this storage rack is illustrated.

FIGS. 1 and 2 illustrate one example of an embodiment of a storage system. It comprises stationary storage racks 1, at least one automated piece goods receiving device 2 and an automated conveying system 3.

The storage racks 1 each form a plurality of storage channels 4 disposed adjacent to one another in each rack level 5 of rack levels 5 lying one above the other. These storage channels 4 can be used to store piece goods 6 of differing width dimensions 7 one behind the other in a depth direction (z-direction) of the storage rack 1, and only piece goods 6 of a single width class are stored within a storage channel 4. The width classes are defined by an electronic control unit 8 prior to storing the piece goods 6, as will be described below. These piece goods 6 may also be of different length dimensions 9. As will be described below, either only a single (long) piece good 6 or several (shorter) piece goods 6 are stored in a storage channel depending on a length dimension 9 of the piece goods 6. However, if several (shorter) piece goods 6 are stored in one storage channel 4, they will belong to a single width class. The piece goods 6 may either be of the same length dimension 9 or different length dimensions 9.

The piece goods 6 can be conveyed and stored without using additional loading aids (LHM), such as trays or containers. The piece goods 6 are packaging units in particular, for example cardboard boxes. The cardboard boxes contain articles, for example from the textile sector or food industry.

These piece goods 6 have a width dimension 7 of between 150 mm and 1,200 mm and a length dimension 9 of between 200 mm and 2,000 mm Examples of some of the width classes B1 . . . B10 are set out below.

| Width class | Width dimension |
| --- | --- |
| B1 | 150 mm to 200 mm |
| B2 | 201 mm to 250 mm |
| B3 | 251 mm to 300 mm |
| B4 | 301 mm to 350 mm |
| B5 | 351 mm to 400 mm |
| B6 | 401 mm to 450 mm |
| B7 | 451 mm to 500 mm |
| B8 | 501 mm to 550 mm |
| B9 | 551 mm to 600 mm |
| B10 | 601 mm to 650 mm |

As may be seen from this list, the width varies from an initial width by ca. 50 mm. This width variation may depend, for example, on the quality of the box and/or the mechanical structure of the transport device, which will be described in more detail below. This situation arises primarily because different boxes are used depending on the customer's requirements. For example, "lower quality" boxes are less intrinsically strong and can have a tendency to become deformed, in particular crushed. In this case, the width variation may be greater than is the case with boxes of better quality. Experience has shown that the width may vary by between 50 mm and 200 mm FIG. 1 illustrates the case of one of the width classes and the fact that the piece goods 6 within a storage channel 4 may be of different width dimensions 7 even though these piece goods 6 belong to this width class. The first piece good 6 has a width dimension 7 of 560 nm, for example, and the second piece good 6 has a width dimension 7 of 580 mm, for example.

In the embodiment illustrated, the storage racks 1 each comprise front rack posts 10, rear rack posts 11, front cross-members 12 and rear cross-members 13 connected to the latter and a storage shelf 14 disposed between and secured to the cross-members 12, 13 on each rack level 5. The top face of the storage shelf 14 provides a storage surface 15 extending in the depth direction (z-direction) on each rack level 5 between the front cross-members 12 and rear cross-members 13. In the lengthways direction (x-direction) of the storage rack 1, the storage surface 15 on each rack level 5 extends at least between the successive front rack posts 10 and rear rack posts 11.

The described storage channels 4 constitute the storage surface 15 and the expression "storage channel" should be construed as being storage spaces fictitiously designated by the control unit 8. In FIG. 1, the storage channels 4 are indicated by broken boundary lines. Depending on the width class and hence the width dimension 7 of the piece goods 6 that are to be stored in a storage channel 4, a width of the (fictitious) storage channel 4 is also determined by the control unit 8.

As may be seen in FIG. 1, storage zones 16, 17 can be defined in the storage rack 1 at each rack level 5 and the control unit 8 assigns different width classes to the storage zones 16, 17, for example width classes B1 . . . B6 to a first storage zone 16 and width classes B7 . . . B10 to the second storage zone 17. Alternatively, however, it might also be that only one width class, for example width class B1, is stored in the first storage zone 16 and a different width class, for example width class B4, is stored in the second storage zone 17.

The piece goods receiving device 2 illustrated in FIGS. 1 and 2 is mounted on a support frame 18 and can be moved along the storage racks 1 in a first direction (x-direction) and vertically in a second direction (y-direction). It is also possible for several piece goods receiving devices 2 to be mounted on the support frame 18, although this is not illustrated. The piece goods receiving device 2 is disposed in a rack aisle 19 (FIG. 1) between the storage racks 1.

The support frame 18 (FIG. 3) is mounted on a travelling unit 20, in particular a conveying vehicle. The travelling unit 20 is a stacker crane and comprises a vertical mast 21, a bottom running gear 22 secured to the mast base and a top running gear 23 secured to the mast head. The bottom running gear 22 is guided on a bottom running rail 24 and the top running gear 23 is guided on a top guide rail 25.

The support frame 18 is mounted on the vertical mast 21 so as to be height-adjustable in the y-direction by means of a lifting drive 26. The lifting drive 26 comprises a traction mechanism 27 and at least one electric drive motor 28 coupled with it (FIG. 1). The electric drive motor 28 is connected to the control unit 8 in order to receive control signals.

The travelling unit 20 is mounted so that it can be moved on the guide rails 24, 25 in the x-direction via a drive unit 29. The bottom running gear 21 comprises the drive unit 29 which is made up of at least one electric drive motor 30 and a drive roller 31 coupled with it. It is preferable if two drive motors 30 and two drive rollers 31 are provided. The electric drive motor(s) 30 is/are connected to the control unit 8 in order to receive control signals.

Such a travelling unit 20 is described in EP 2 419 365 B1, for example, the subject matter of which is included in this disclosure.

As may be seen from FIGS. 1 to 3, the piece goods receiving device 2 is mounted on the support frame 18, which can be moved in a first direction (x-direction) and a second direction (y-direction), as is a transport device 32 which can be extended (on an automated basis) in a third direction (z-direction) into the storage channel 4 in order to store piece goods 6 in the storage channels 4 and retrieve piece goods 6 from then storage channels 4. With a view to retaining clarity, the piece goods receiving device 2 is only schematically indicated in FIGS. 1 and 2.

The piece goods receiving device 2, illustrated with its functional units in more detail in FIG. 3, may comprise a motorized conveyor device 33. The conveyor device 33 is a belt conveyor or roller conveyor, for example, the transport surface 34 of which substantially corresponds in terms of length to the maximum storage depth 35 (FIG. 8*a*) of a storage channel 4 and in terms of width to substantially the maximum width dimension 7 of a piece good 6. The belt convey—or is driven by at least one drive motor 36 (FIG. 2). If the conveyor device 33 is a roller conveyor, some of the conveyor rollers or all of the conveyor rollers may each be provided with an electric drive motor and the drive motor is disposed inside the roller body. The electric drive motor(s) of the belt conveyor/roller conveyor is/are connected to the control unit 8 in order to receive control signals.

The piece goods receiving device 2 may also have supporting means 37 in the oppositely lying end regions of the motorized conveyor device 33. The supporting means 37 are respectively provided in the form of a conveyor device 38 with non-driven supporting rollers or, preferably, a motorized conveyor device 38 in each case. A particularly simple construction can be obtained if the motorized conveyor devices 38 are provided in the form of a driven supporting roller in each case. These driven supporting rollers may be equipped with an electric drive motor, in which case the drive motor is disposed inside the roller body. The electric drive motors are connected to the control unit 8 in order to receive control signals. A transport surface 34 of the conveyor device 33 and a transport surface (not illustrated) of the conveyor device 38 extend in a same plane.

The supporting means 37 is used to support the weight of the piece goods 6 when they are being moved between the piece goods receiving device 2 and the storage channel 4. If the supporting means 37 is provided in the form of a motorized conveyor device 38, a driving force may also be imparted to the piece goods 6. The driving force is selected so that a forward travel speed of the conveyor device 38, in particular the motorized supporting roller, is higher than a forward travel speed of the conveyor device 33. This ensures that the piece goods 6 on the piece goods receiving device 2 can be reliably lined up one against the other in a tightly packed manner when a piece good 6 or several piece goods 6 is/are being retrieved from the storage channel 4 by the transport device 32, for example, and positioned against a piece good 6 or a piece good 6 of a (partial) group of piece goods 61 on the piece goods receiving device 2 (see FIG. 9*a*-9*f*).

The piece goods receiving device 2 may also have stop elements 39, 40 disposed in the oppositely lying end regions of the motorized conveyor device 33. These are mounted on the support frame 18 so that they can be moved between an initial position moved out of the travel path of the piece goods 6 along the conveyor device 33 and an operating position moved into the travel path of the piece goods 6 along the conveyor device 33. The stop elements 39, 40 are respectively coupled with an actuator (schematically indicated in FIG. 2) comprising a drive motor. The drive motors are connected to the control unit 8 in order to receive control signals.

The piece goods receiving device 2 may also have a sensor system configured to detect the piece goods 6 on the piece goods receiving device 2. It is connected to the control unit 8 in order to determine an actual length of the group of piece goods on the piece goods receiving device 2. In the embodiment illustrated, the sensor system is provided in the form of measuring units 41 disposed in the oppositely lying end regions of the conveyor device 33 which detect a distance to the respective foremost piece good 6 of the group of piece goods. From the measurement values, the control unit 8 determines an actual length of the group of piece goods after they have been transferred to the piece goods receiving device 2. The measuring units 41 are optoelectronic measuring systems, in particular laser or infrared measuring systems. Alternatively, the sensor system may be provided in the form of an image processing system with a camera.

The illustrated transport device 32 can be extracted from the piece goods receiving device 2 in both directions so that piece goods 6 can be stored in and/or piece goods 6 can be retrieved from storage racks 1 disposed on either side if the piece goods receiving device 2. The transport device 32 may comprise mutually parallel telescopic units 42 mounted on the support frame 18, each of which comprises a base frame 43 and a rail 44, 45 which can be synchronously extracted and retracted horizontally relative to the base frame 43 in one direction (z-direction). The telescopic units 42 form telescopic arms. Specifically, the first rail 44 is mounted so as to move on the base frame 43 and the second rail 45 is mounted so as to move on the first rail 44. The first rail 44 can be moved relative to the base frame 43 with the aid of a drive mechanism (not illustrated), for example a drive chain and toothed rack assembly. The chain drive is coupled with an electric drive motor 46 (FIG. 2). The electric drive motor 46 is connected to the control unit 8 in order to receive control signals. A first belt (not illustrated) is looped around a first roller mounted on the first rail 44 and secured to the base frame 43 by its first end and to the second rail 45 by its second end. A second belt (not illustrated) is looped around a second roller mounted on the first rail 44 and secured to the base frame 43 by its first end and to the second rail 45 by its second end. When the first rail 44 is moved by the drive system, the second rail 45 is also moved via the belt, in other words is extended and/or retracted.

In the embodiment illustrated as an example, the second rail 45 comprises drive motors 47 for transport elements 48, 49 for transporting piece goods 6 between the storage channel 4 and piece goods receiving device 2. The transport elements 48, 49 are disposed in the oppositely lying end regions of the second rail 45 and each transport element 48, 49 (driver element) is coupled with a drive motor 47 and can be moved by it between an initial position and an operating position. In the initial position, the transport elements 48, 49 are moved out of the travel path of the piece goods 6 so that the piece goods 6 are able to move past the transport elements 48, 49, and in the operating position, the transport elements 48, 49 are moved into the travel path of the piece goods 6 so that the transport elements 48, 49 positively engage with the piece goods 6.

The telescopic units 42 are preferably also mounted on the support frame 18 so that they can be moved relative to one another and in the x-direction by means of an actuator drive. This being the case, a distance between the telescopic units 42 is variable and can be adjusted to suit the respective width classes B1 . . . B10. The actuator drive comprises at least one electric drive motor 50 which is connected to the control unit 8 in order to receive control signals.

The design of these telescopic units 42 and the adjusting mechanisms for adjusting the distance and telescopic movement are described in detail in U.S. 6,923,612 B2, the subject matter of which is included in this disclosure.

As may be seen from FIGS. 1 and 2, an automated conveying system 3 is provided and comprises a first conveyor device 51 for conveying piece goods 6 to the piece goods receiving device 2 and a second conveyor device 52 for conveying piece goods 6 away from the piece goods receiving device 2. The first conveyor device 51 adjoins a goods-out section 67 disposed upstream of it in the conveying direction. The second conveyor device 51 adjoins a goods-in section 68 disposed downstream of it in the conveying direction. The second conveyor device 52 leads to a logistical work process, not illustrated, where customer orders are automatically or manually picked or consolidated, for example. The first conveyor device 51 forms a pick-up station 53 on which piece goods 6 of a width class are assembled, for example width class B2. In FIG. 1, the piece goods 6 of this width class are positioned against a stop element 54 and lying one against the other in a tightly packed manner to form a group of piece goods. The stop element 54 co-operates with the first conveyor device 51 in an end region lying downstream and is mounted on a support frame so that it can be moved by means of an actuator drive 55 (FIG. 2), for example a pneumatically operated lifting cylinder, between an initial position moved out of the path on which the piece goods 6 are transported along the conveyor device 51 and an operating position moved into the transport path of the piece goods 6 along the conveyor device 51.

The first conveyor device 51 used to transport incoming piece goods 6 in the conveying direction comprises a first conveyor section, a second conveyor section and a third conveyor section. A pick-up station 53 is provided in the first conveyor section. The pick-up station 53 comprises a roller conveyor, belt conveyor or such like, for example. If the pick-up station 53 is a roller conveyor, some or all of the conveyor rollers may be so-called motorized rollers. Disposed in the second conveyor section is a belt converter 56 which can be raised and lowered for example, which provides a conveyor connection between the first conveyor section and third conveyor section. The third conveyor section is provided as a roller conveyor, belt conveyor or similar, for example.

The second conveyor device 52 for transporting piece goods 6 away in the conveying direction comprises a first conveyor section, a second conveyor section and a third conveyor section. A transfer section 57 is provided in the first conveyor section. The transfer section 57 is provided in the form of a roller conveyor, belt conveyor or similar, for example. If the transfer section 57 is a roller conveyor, some or all of the conveyor rollers may be so-called motorized rollers. Disposed in the second conveyor section is a belt converter 56 which can be raised and lowered for example, which provides a conveyor connection between the first conveyor section and third conveyor section. The third conveyor section is provided as a roller conveyor, belt conveyor or similar, for example.

As may be seen from FIG. 1, a measuring station 58, in particular an optical measuring station, is disposed along the automated conveying system 3, at which preferably every piece good 6 is contactlessly measured. The measuring station 58 is preferably located upstream of a goods-out section 67 at which piece goods 6 are transferred to the first conveyor device 51.

The (maximum) width dimension 7 and (maximum) length dimension 9 of a piece good 6 are preferably detected. It would also be conceivable for a volume of the piece goods 6 to be measured. Another option would be to determine only the width dimension 7 of the piece goods 6. Accordingly, the width dimension 7 corresponds to that dimension of a piece good 6 extending transversely to the longitudinal extension of the storage channel 4 when the piece good 6 has been placed in the storage channel 4. The length dimension 9 then corresponds to that dimension of a piece good 6 extending in the direction of the longitudinal extension of the storage channel 4 when the piece good 6 has been placed in the storage channel 4.

The measuring station 58 is connected to the control unit 8 so that it can transmit the actual values of the width dimension 7 or the width dimension 7 and length dimension 9 to an electronic evaluation module 59. On the basis of the detected width dimension 7 or width dimension 7 and length dimension 9, the control unit 8 controls the piece goods receiving device 2, transport device 32 and/or conveyor device 51 for transporting piece goods 6 to the piece goods receiving device 2 so that the piece goods 6 can be selectively conveyed to at least one pick-up station 53 according to width classes, these piece goods 6 can be placed on the piece goods receiving device 2 and the piece goods 6 transferred to the piece goods receiving device 2 stored in a storage channel 4 of a defined width class.

FIGS. 4 to 6 are block diagrams illustrating different layouts of storage systems. FIG. 4 illustrates a storage system based on FIG. 1 having two storage racks 1 and at least one piece goods receiving device 2, and the storage system adjoins a goods entrance and a goods exit. The piece goods 6 are brought in at the goods entrance and conveyed by means of the first conveyor device 51 to the storage system, where they are picked up by the piece goods receiving device 2 and stored. In the textile sector or food industry, it is common for relatively large quantities of piece goods 6 of the same type to be handled. The expression "same type" should be construed as meaning that the articles are not necessarily identical as such but their width dimensions 7 and/or length dimensions 9 are. If the goods being handled are shirts for example, they may be sorted according to size. The first boxes contain shirts of the X-Large size, the second boxes contain shirts of the Large size, the third boxes contain shirts of Medium size and the fourth boxes contain shirts of the Small size. However, all the boxes are of identical width dimensions and length dimensions.

As is clear from this example, an enormously high number of boxes of the same type and hence piece goods 6 of the same type are handled over a period of time, and these must be placed in storage as quickly as possible to avoid blocking the goods entrance for an unnecessarily long time. It is not necessary to sort this group of goods prior to storing them because the piece goods 6 all belong to the same width class. The optional sorting step is indicated by broken lines in FIG. 4. It is not until the next group of goods arrives that care must be taken to ensure that there is no mixing between the groups of goods. This being the case, the piece goods 6 must in turn be forwarded to at least one pick-up station selectively according to width classes, as will be described below.

The boxes from the supplier can be dispensed directly to at least one work station (not illustrated) adjoining the first conveyor device 51 and conveyed onwards by the first conveyor device 51. Alternatively, the boxes may also be supplied on a freight carrier, for example on a pallet, in which case boxes stacked on the freight carrier will have to be separated and transferred to the first conveyor device 51. Separation may be done manually or automatically.

If a supplier supplies different piece goods 6, for example shirts, pullovers and T-shirts etc., and the boxes are therefore of different width dimensions 7 and/or length dimensions 9, they will have to be sorted. Sorting may be done manually or automatically. If using automatic sorting, the conveying system 3 will have a sorting device (not illustrated) by means of which the piece goods 6 are sorted at least on the basis of their width dimensions 7 and forwarded to the pick-up station 53 in the sorted sequence by means of the first conveyor device 51.

Such an automatic sorting device is preferably provided downstream of the measuring station 58 in the direction in which the piece goods 6 are conveyed along the first conveyor device 51.

Alternatively, another option is for the supplier to sort the different piece goods 6 based on width dimension 7 depending on size and transfer them to the first conveyor device 51. In this case, it will be necessary to provide a separate sorting device upstream of the storage area. Different width classes are made ready consecutively at the pick-up station 53. For example, piece goods 6 of a first width class are firstly put together in a corresponding number as a group of piece goods at the pick-up station 53, after which piece goods 6 of a different width class are put together in a corresponding number as a group of piece goods.

The described sorting may also take place on the basis of the width dimensions 7 and length dimensions 9 of the piece goods 6, in which case sorting will primarily be by width dimension 7 so that a group of piece goods contains only piece goods 6 of a single width class whereas the length dimensions 9 of the piece goods 6 may vary.

In other words, it is of advantage if the piece goods 6 are forwarded to the pick-up station 53 selectively depending at least on their width dimension 7. Therefore, the group of piece goods 6 of a first width class is put together at the pick-up station 53 first of all, followed by a group of piece goods 6 of a second width class. The first group of piece goods thus comprises at least two piece goods 6 having the same first width dimension 7 and the second group of piece goods comprises at least two piece goods 6 having the same second width dimension 7.

When a customer order has to be processed, the control unit 8 receives a picking order or disbursement order, which in turn activates the piece goods receiving device 2 and transport device 32 to enable the desired piece goods 6 for this order to be retrieved. The piece goods receiving device 2 conveys the piece goods 6 to the transfer section 57 from where they are conveyed onwards by the second conveyor device 52.

Based on another embodiment, it is also possible for sorting to take place automatically or manually by article and article type.

The articles are shirts, pullovers, T-shirts and similar, for example. The article type defines the size, color and such like, for example. Accordingly, the articles "shirt" of X-Large size and color white might constitute a first piece good 6, the articles "shirt" of Large size and color white might constitute a second piece good 6, etc., the articles "shirt" of X-Large size and color black might constitute a third piece good 6, the articles "shirt" of Large size and color black a fourth piece good 6, etc. The piece goods 6 constituting the articles "shirts" in this case are of the same width dimensions 7 and length dimensions 9 in each case. However, it would also be possible to sort these (same) piece goods 6 by article type. For example, all of the first piece goods 6 are transferred to the conveying system 3 first of all, followed by all of the second piece goods 6, etc.

The articles "pullovers" of X-Large size and color white may constitute a fifth piece good 6, the articles "pullovers" of Large size and color white may constitute a sixth piece good, etc. The fifth/sixth piece goods 6 based on the articles "pullovers" have the same width dimensions 7 and length dimensions 9 but a different width dimension 7 and length dimension 9 from the first/second/third/fourth piece goods 6 based on the articles "shirts". However, it is also possible for these (same) fifth/sixth piece goods 6 to be sorted by article type. For example, all of the fifth piece goods 6 are transferred to the conveying system 3 first of all, followed by all of the sixth piece goods 6, etc. However, the first/second/third/fourth piece goods 6 and fifth/sixth piece goods 6 are forwarded by the conveying system 3 to the pick-up station 53 on a selective basis.

FIG. 5 illustrates the layout of several storage systems based on FIG. 1, each storage system having two storage racks 1 and at least one piece goods receiving device 2, and the storage systems adjoin a common goods entrance and a common goods exit. The piece goods 6 are delivered to the goods entrance and are conveyed respectively by means of the first conveyor device 51 to the respective storage system, where they are picked up by the piece goods receiving device 2 and placed in storage, as described above in connection with FIG. 4.

FIG. 6 illustrates the layout of several storage systems based on FIG. 1, each storage system having two storage racks 1 and at least one piece goods receiving device 2, and the storage systems adjoin a common goods entrance and a common goods exit as well as a common sorting device adjoining the conveying system 3.

The sorting device comprises a closed distribution system (conveyor track) having a first conveyor section, a second conveyor section and third conveyor sections connecting the latter. Adjoining the first conveyor section is a plurality of work stations so that the piece goods 6 or boxes delivered by suppliers, which may optionally be different, and transferred to the work stations can be fed into the distribution system. Alternatively, the boxes may also be delivered on freight carriers, for example pallets, in which case the boxes stacked on the freight carriers will have to be separated and fed into the distribution system. Separation may be done manually or automatically.

Adjoining the second conveyor section are the conveyor device 51 of the first storage system and the conveyor device 51 of the second storage system.

If different piece goods 6 (from several suppliers) are being transferred to the distribution system and the boxes are therefore of different width dimensions 7 and/or length dimensions 9, sorting will take place by means of the distribution system.

The distribution system is able to forward different piece goods 6, sorted at least on the basis of their width dimensions 7, to the conveyor device 51 of the first storage system and to the conveyor device 51 of the second storage system. Accordingly, different width classes are put together consecutively at the first pick-up station 53 of the first storage system and different width classes are put together consecutively at the second pick-up station 53 of the second storage system. The sorting process may also be controlled in such a way that at the first pick-up station 53 of the first storage system and at the second pick-up station 53 of the second storage system, piece goods 6 of the same width classes are put together in parallel. This means that there is a uniform distribution of the different piece goods 6 into the storage systems so that picking orders can be processed by several piece goods receiving devices 2 in parallel. Alternatively, however, it would also be conceivable for different width classes to be stored in the storage systems, for example width classes B1 . . . B5 in the first storage system and width classes B6 . . . B10 in the second storage system. An application of this type is of advantage if there is a greater variety of articles but a lower stock turnover rate in one of the storage systems (first storage system) and a relatively smaller variety of articles with a higher stock turnover rate in another one of the storage systems (second storage system). In principle, running the storage operations in parallel enables a particularly high degree of overall efficiency to be achieved.

The described sorting process may also take place on the basis of the width dimensions 7 and length dimensions 9 of the piece goods 6, in which case sorting will primarily be by width dimension 7 so that a group of piece goods at the first pick-up station 53 contains only piece goods 6 of a single width class, for example width class B2, whereas the length dimensions 9 of the piece goods 6 may vary, and a group of piece goods at the second pick-up station 53 contains only piece goods 6 of a single width class, for example width class B6, whereas the length dimensions 9 of the piece goods 6 may vary.

FIGS. 7a, 7b and 8a-8e illustrate the method sequence for storing piece goods 6 in at least one of a number of storage channels 4 using a flow chart and sequence diagram.

The piece goods 6 are delivered to the goods entrance. In step S1, storage orders are electronically detected, for example at an input device, for example a computer. The storage orders based on this example of an embodiment comprise different piece goods 6. The storage orders are continuously transmitted to the control unit 8, which in turn co-ordinates control of the conveying system, piece goods receiving device 2 and transport device 32.

The piece goods 6 are conveyed by the conveying system from the goods entrance to the storage system in step S2. Before the piece goods 6 are forwarded to the pick-up station 53, they may be measured in a step S3 (optional) in the manner described above. The evaluation module 59 (FIG. 1) of the control unit 8 determines, preferably for each of the piece goods 6, the actual value of the width dimension 7 or the actual values of the width dimension 7 and length dimension 9. This is the maximum width dimension 7 and optionally maximum length dimension 9 (along a circumferential line) of the piece good 6. Alternatively, the target value of the width dimension 7 or the target values of the width dimension 7 and length dimension 9 for each of the piece goods 6 may also be transmitted to the control unit 8, these being stored as retrievable reference data in a data bank. In this case, it is sufficient for the piece goods 6 to be identified using a data carrier, for example a barcode or an RFID (Radio Frequency Identification Device), and a piece good identification device, for example a reading device or image processing system. In particular, an identification code may be scanned from a data carrier, in particular a barcode, applied by the supplier to every box (packaging unit) or to a freight carrier (for example a pallet) on which piece goods 6 of the same type are stacked. This identification code can be used to access the data bank and the stored target values of the width dimension 7 or the target values of the width dimension 7 and length dimension 9 of the piece goods 6.

If the actual value of the width dimension 7 or the actual values of the width dimension 7 and length dimension 9 of the piece goods 6 are detected, allowance can also be made for deviations in the measurements or shape of the boxes (packaging units) when controlling the transport device 32 and/or conveying system.

This has also proved to be of advantage in situations where it is established by the control unit 8 that the piece goods 6 for a storage order cannot be stored in the desired number in a storage channel 4 because the available storage depth 35 is too short. It would then be possible to store piece goods 6 of a width class and in a computed number in a storage channel 4 if the piece goods 6 have a length dimension 9 that is stored as a target value in the reference data. For example, based on the target values for the length dimension 9 for each piece good 6, it would be possible to store four piece goods 6 in number having width class B6 in a storage channel 4. However, the evaluation module 59 of the control unit 8 has evaluated the actual values of the piece goods 6 and determined an actual length of the "planned" group of piece goods which corresponds to or exceeds the maximum available storage depth 35. This being the case, it would not be possible to store the "planned" group of piece goods having four piece goods 6 of width class B6 but only three piece goods 6, as indicated by broken lines in FIG. 1. The control unit 8 can then activate the conveying system 3 in such a way that only a "corrected" number of piece goods 6 is transferred onto the first conveyor device 51 at the goods-out section 67, in other words three piece goods 6.

In step S4, the piece goods 6 are assigned a width class B1 . . . B10 depending on their width dimension 7. They can be assigned the actual values of the width dimension 7 or target values of the width dimension 7. As described above, a piece good 6 having a width dimension 7 of between 201 mm and 250 mm, for example, is assigned width class B2, a piece good 6 having a width dimension 7 of between 501 mm and 550 mm, for example, is assigned width class B8, etc. This assignment process is operated on an automated basis by an analyzer module 60 or a logic system of the control unit 8. The width classes B1 . . . B10 are set up prior to switching on the storage system and detected at the control unit 8.

The first storage order comprises piece goods 6 assigned to the second width class B2 and the second storage order comprises piece goods 6 assigned to the eighth width class B8. For example, the first storage order comprises eight piece goods 6-2 of the second width class B2 and the second storage order comprises six piece goods 6-8 of the eighth width class B8.

In step S5, the piece goods 6-2, 6-8 are forwarded by the conveying system 3 selectively on the basis of width class to at least one pick-up station 53, where they are lined up one after the other, see FIG. 8a-8e. Based on this example of an embodiment, the eight piece goods 6-2 of the second width class B2 are firstly lined up one after the other at the at least one pick-up station 53. Then, the six piece goods 6-8 of the eighth width class B8 are lined up one after the other at the at least one pick-up station 53. Alternatively, although this is not illustrated, if several storage systems are provided, it would also be possible for four piece goods 6-2 of the second width class B2 to be lined up at a first pick-up station 53 and four piece goods 6-2 of the second width class B2 to be lined up at a second pick-up station 53. Then, the six piece goods 6-8 of the eighth width class B4 are forwarded to the first pick-up station 53 and second pick-up station 53 and lined up in the same way.

In a step S6, the control unit 8 determines the at least one storage channel 4 in which the piece goods 6 should be stored in accordance with a storage order. If the first storage order is made up of more piece goods 6 than can be accommodated in a storage channel 4, the control unit 8 determines a corresponding number of storage channels 4 in which the group of piece goods 61-2 (as illustrated in FIG. 8a-8e) can be stored one after the other.

Particularly high storage efficiency can be achieved if the control unit 8 determines which storage channels 4 are empty, in particular within a storage zone 16, 17. Use can be made of the entire storage depth 35 of an empty storage channel 4 and a maximum number of piece goods 6 can be stored. Accordingly, four piece goods 6-2 of width class B2 can be accommodated in the empty storage channel 4 in the first storage zone 16 based on the known length dimension 9 of the piece goods 6-2 and three piece goods 6-8 of width class B8 can be accommodated in the empty storage channel 4 in the second storage zone 17 based on the known length dimension 9 of the piece goods 6-8.

The situation in which it is not possible to make full use of the entire storage depth 35 because one or more piece goods 6 have already been stored in a storage channel 4 will be explained with reference to FIGS. 9a-9f. This will be referred to as a so-called "additional storage operation".

As described above, the storage rack 1 is divided into storage zones 16, 17 and each storage zone 16, 17 forms a plurality of adjacently disposed (fictitious) storage channels 4. If a first storage channel 4 is occupied by piece goods 6 of a selected width class, for example width class B2, the occupancy of the remaining storage channels 4 within the same storage zone 16, 17 is also set by the control unit 8 irrespective of the occupancy of the first storage channel 4 in such a way that, based on a first embodiment (see FIG. 8a-8e, storage zone 16) the remaining storage channels 4 will only be occupied by piece goods 6 of the same width class, in which case all the storage channels 4 will be occupied by piece goods 4 of width class B2.

Based on a second embodiment (see FIG. 1, storage zone 17), a (right-hand) first storage channel 4 is occupied by piece goods 6 of a selected width class, for example width class B7. The remaining storage channels 4 in this instance are occupied by only piece goods 6 of selected width classes, for example width classes B8-B10. It should be noted that the width classes B8-B10 are similar to the selected width class B6 in the first storage channel 4. Accordingly, storage is not based on the chaotic principle whereby piece goods 6 are stored in any storage channels 4 which might be free and instead, storage is based on a selected occupancy of the storage channels 4 graded by width classes.

The piece goods 6 of the width classes are conveyed to the storage channels 4 of the storage zones 16, 17 by the piece goods receiving device 2 and transferred to the storage channels 4 of the storage zones 16, 17 by the transport device 32.

In step S7, the piece goods receiving device 2 is positioned opposite the pick-up station 53 by moving it in a first direction (x-direction) and optionally a second direction (y-direction), see FIG. 8a.

The piece goods 6-2 are then conveyed from the pick-up station 53 to the piece goods receiving device 2 and transferred to the piece goods receiving device 2, step S8. As may be seen from FIGS. 8a and 8b, the piece goods 6-2 can already be placed in a tightly packed arrangement to form a group of piece goods 61-2 before being transferred to the piece goods receiving device 2 so that the piece goods 6-2 are therefore lined up one against the other in a tightly packed manner in the conveying direction. A compacting device 62 may be provided at the pick-up station 53 for this purpose. It is provided in the form of the stop element 54 described above for example, which can be moved between the initial position in which it is moved out of the transport path of the piece goods 6-2 along the conveyor device 51 and the operating position of the stop element in which it is moved into the transport path of the piece goods 6-2 along the conveyor device 51 so that the piece goods 6-2 run into it.

Alternatively, this "compacting operation" may also take place on the piece goods receiving device 2. As described above, the piece goods receiving device 2 comprises the conveyor device 33, the transport elements 48, 49 and optionally the stop elements 39, 40. When the piece goods 6 are being conveyed on the piece goods receiving device 2 by the conveyor device 33, they can be positioned against the transport elements 49 placed in the operating position. In the case of narrow piece goods 6-1 (piece goods of the first width class B1), the stop element 40 is moved into the operating position so that these piece goods 6 can be positioned against the stop element 40. Based on these embodiments, the group of piece goods 61-2 is not put together until reaching the piece goods receiving device 2. However, the group of piece goods 61-2 already assembled on the pick-up station 53 can be formed into a packed arrangement again on the piece goods receiving device 2 if it is to be assumed that the piece goods 6-2 might move apart from one another due to movement as they are being conveyed in the conveying direction from the pick-up station 53 to the piece goods receiving device 2.

When the piece goods 6-2 are disposed on the piece goods receiving device 2 and they have been put together to form a group of piece goods 61-2, as illustrated in FIG. 8b, an actual length of the group of piece goods 61-2 can be detected by means of the sensor system. The control unit 8 comprises an evaluation module 66 (analyzer module), by means of which the actual length of the group of piece goods 61-2 is compared with a target length of the group of piece goods 61-2. Based on the storage order, the control unit 8 can determine a target length of the group of piece goods 61-2 given that the individual length dimensions 9 of the piece goods 6-2 are based on the measurement taken at the measuring station 58 and the target length corresponds to the sum of these length dimensions 9. In principle, however, instead of the (measured) actual values for the length dimensions 9, it would also be possible to use the target values for the length dimensions 9 taken from the reference data relating to the piece goods 6-2. However, this is assuming that the piece goods 6 are dimensionally stable. If the actual length of the group of piece goods 61-2 deviates from the target length of the group of piece goods 61-2, the evaluation module 66 issues a monitoring signal to the control unit 8. The deviation must be above the sum of the usual tolerance deviations due to deformation of the boxes (piece goods 6-2). For example, this is the case if the deviation is greater than 50 mm. The monitoring signal may prompt an optical and/or acoustic fault warning to an operator. Such a fault warning will be issued if the piece goods 6-2 were not transferred from the pick-up station 53 to the piece goods receiving device 2 in an orderly manner, for example if there is one piece good 6-2 fewer than is necessary on the piece goods receiving device 2.

Figure 8C:
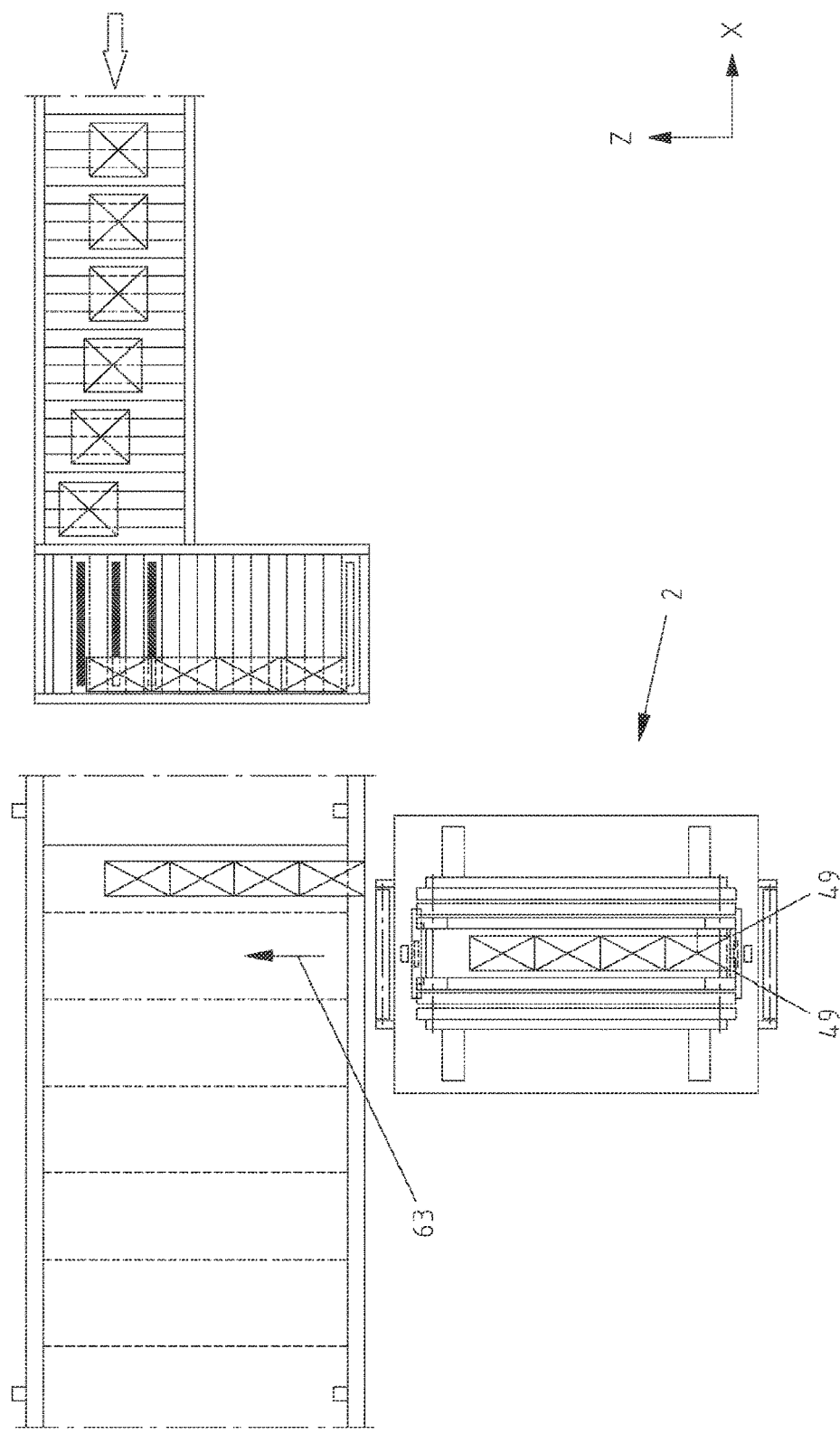

In step S9, the piece goods receiving device 2 is positioned opposite the storage channel 4 designated by the control unit 8 in which the group of piece goods 61-2 is to be stored by moving it in a first direction (x-direction) and optionally a second direction (y-direction), see FIG. 8c.

In a step S10, the group of piece goods 61-2 is then conveyed by the transport device 32 from the piece goods receiving device 2 into the designated storage channel 4. Based on the embodiment illustrated, the piece goods 6-2 are moved simultaneously by the transport elements 49, which are disposed in the oppositely lying end region of the transport device 32 in the direction of movement (storage direction indicated by arrow 63). It goes without saying that this movement can be effected by means of just one transport element 49, which is disposed in the oppositely lying end region of the transport device 32 in the direction of movement (storage direction indicated by arrow 63). The piece goods 6-2 are moved in the depth direction of the storage channel 4 to the degree that the rearmost piece good 6-2 in the direction of movement (storage direction indicated by arrow 63) extends with its lateral wall 64 substantially flush with an end edge 65 of the storage channel 4, see FIG. 8d. The expression "substantially flush" should be construed as meaning that the piece good 6-2 may sit with its lateral wall 64 offset from the end edge 65 in the direction of the storage channel 4 to the degree that there is an offset distance of less than 80 mm, for example 20 mm. The piece good 6-2 may also extend along the end edge 65 of the storage channel 4 by the offset distance.

When the piece goods 6-2 are located in the storage channel 4, the transport device 32 extended into the storage channel 4, in particular the telescopic units 42, are moved back into an initial position. It would also be possible for the group of piece goods 61-2 to be positioned relative to the piece goods receiving device 2 by a centering stroke of the telescopic units 42 before being moved into the storage channel 4 so that the piece goods 6-2 are aligned in a row exactly one after the other before they are conveyed into the storage channel 4. The piece goods 6-2 of the group of piece goods 61-2 may also be positioned again on the piece goods receiving device 2 in a direction parallel with the longitudinal extension of the storage channel 4 and before moving the group of piece goods 61-2, in which case the piece goods 6-2 are moved by the conveyor device 33 opposite the storage direction 63 towards the transport elements 40 of the transport device 32 and/or stop element 40 disposed in an initial position. This ensures that the piece goods 6-2 of the group of piece goods 61-2 are aligned one against the other in a tightly packed manner before being moved into the storage channel 4. Even if the piece goods 6-2 are unexpectedly skew during the movement of the piece goods receiving device 2, this will have no effect on the accuracy with which the piece goods 6-2 are set down in the storage channel 4.

As mentioned above, the piece goods receiving device 2 comprises supporting means 37 which are used as a guide surface for the piece goods 6 to be stored. The supporting means 37 thus bridge the gap between the piece goods receiving device 2 and the end edge 65. As a result of this feature, it is now possible to move piece goods 6 having a particularly short length dimension 9, for example in the order of 150 mm, between the piece goods receiving device 2 and the storage channel 4. If the supporting means 37 is a driven conveyor device 38, a driving force is applied in order to move the respective piece good 6. The conveying speed of the conveyor device 38 substantially corresponds to the speed at which the transport device 32 is extended when it is extended into the storage channel 4.

Since the first storage order comprises yet other piece goods 6-2 of the second width class B2, the described storage operation is repeated until all the piece goods 6-2 have been stored in the several storage channels 4 of the first storage zone 16, step S11. The second storage order comprising piece goods 6-8 of the eighth width class B8 is then processed in the same manner and in this instance the piece goods 6-8 are stored in a number of storage channels 4 of the second storage zone 17.

Although, for the sake of simplicity in FIGS. 1, 8a-8e, the piece goods 6 in each storage channel 4 always have the same width dimensions 7, it would also be possible within the meaning of the invention to store piece goods 6 that are of the same width class, for example width class B9, but have slightly different width dimensions 7 in one storage channel 4, as indicated in one of the storage channels 4 in FIG. 1. For example, the piece good 6 deposited in the front storage space in the storage channel 4 in the depth direction has a width dimension of 560 mm and the piece good 6 deposited in the storage channel 4 in the rear storage space in the depth direction has a width dimension of 600 mm. However, both piece goods 6 have been assigned width class B9 by the control unit 8.

FIGS. 9a-9f illustrate a different embodiment for storing piece goods 6-8. Such a storage operation is used in particular during off-peak times. In this instance, there is already one or a number of piece goods 6-8 of width class B8 in a storage channel 4 but the storage depth 35 has still not been used to its full capacity. This being the case, another or a number of other piece goods 6-8 of this width class B8 can additionally be stored in this storage channel 4. The piece good 6-8 and/or the piece goods 6-8 which is/are to be additionally stored in the selected storage channel 4, is/are either conveyed by the conveying system 3 to the pick-up station 53 or taken out of another storage channel 4.

The control unit 8 firstly determines a free storage depth 35 in the designated storage channel 4 which remains free having deducted the length dimension 9 of the temporarily stored piece good 6-8 or the temporarily stored piece goods 6-8. The control unit 8 then determines the number of piece goods 6-8 which can be additionally store in the storage channel 4 designated for this width class, for example width class B8.

Figure 9A:
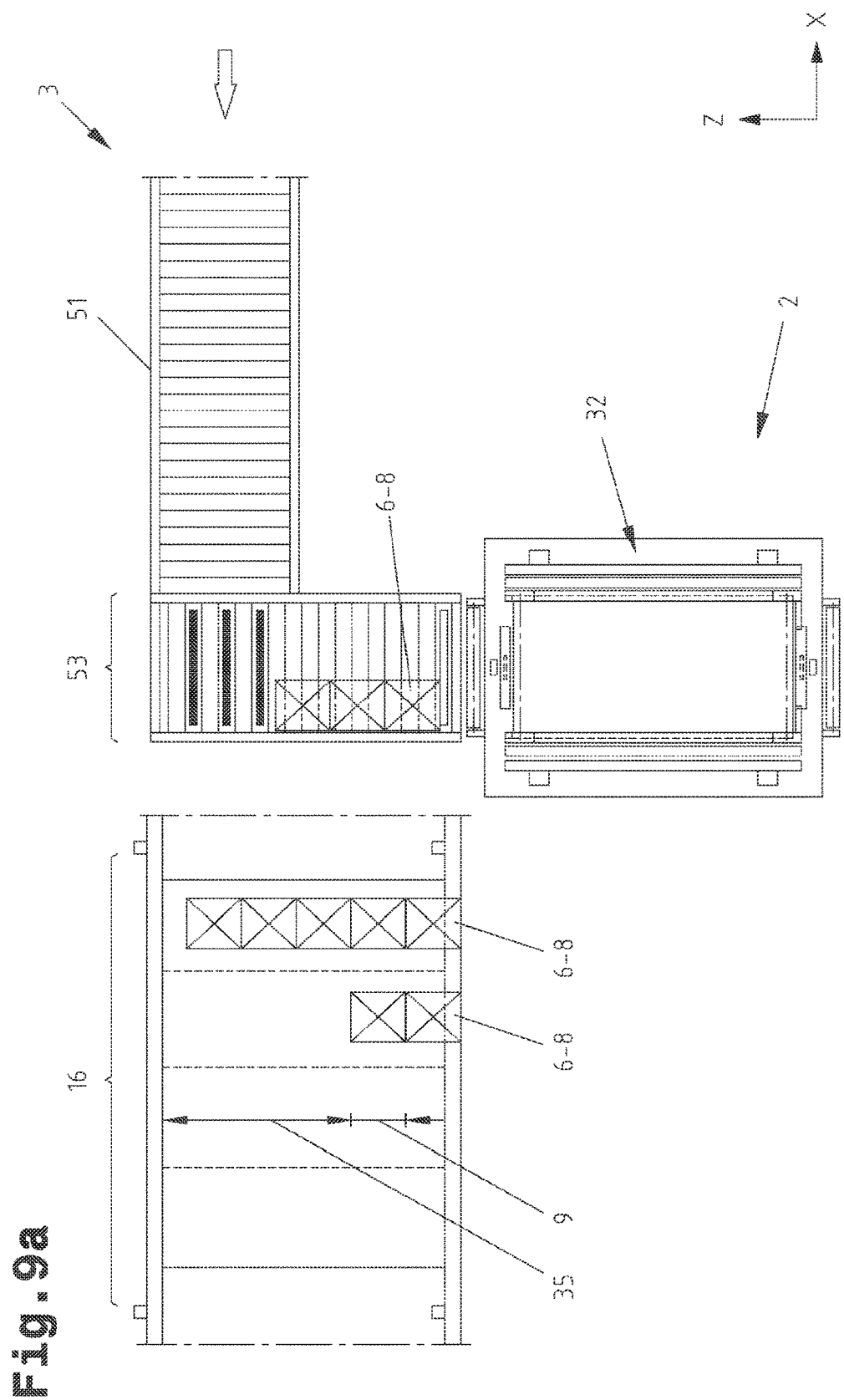

As illustrated in FIG. 9a, the piece goods receiving device 2 is firstly positioned in front of the pick-up station 53 in order to pick up the piece good or goods 6-8 which can be additionally stored in the storage channel 4 of width class B8. In FIG. 9b, three piece goods 6-8 have been transferred to the piece goods receiving device 2.

These piece goods 6-8 can in turn be placed one against the other in a tightly packed manner to form a group of piece goods 61-8 on the piece goods receiving device 2, although this is not absolutely necessary. When the piece goods 6-8 have been placed one against the other in a tightly packed manner to form a group of piece goods 61-8, as described in detail above with reference to FIGS. 7a, 7b, step 8, the piece goods 61-8 can be assembled in a group of piece goods 61-8 before being transferred to the piece goods receiving device 2 or after having been transferred to the piece goods receiving device 2.

Again, the actual length of the group of piece goods 61-8 on the piece goods receiving device 2 can be determined, as described above.

In FIG. 9c, the piece goods receiving device 2 is positioned opposite the storage channel 4 designated by the control unit 8 in which the piece good 6-8 or group of piece goods 61-8 is/are to be stored. The piece good 6-8 or group of piece goods 61-8 is/are positioned by means of the conveyor device 33 in a direction parallel with the depth direction of the storage channel 4 before the operation of moving them to another storage place, as will be described below. For example, the piece good 6-8 or group of piece goods 61-8 is moved against the stop element 39, now moved into the operating position, adjacent to the storage channel 4 in which the piece good 6-8 or group of piece goods 61-8 is/are to be stored (FIG. 3), or against the adjacent transport elements 48 that have now been moved into the operating position, by driving the conveyor device 33 in a conveying direction in the direction towards the storage channel 4, namely in the storage direction. The stop element 39 is then moved into the initial position or the transport elements 48 are moved into the initial position and the transport device 32 is extended into the storage channel. The transport device 32 is extended in the z-direction to the degree that it moves from a piece good 6-8 deposited in a foremost storage space in the storage channel 4 to a lateral wall 69 facing away from the end edge 65. If several piece goods 6-8 have been deposited in the storage channel 4, the transport device 32 is extended in the z-direction to the degree that it moves from a piece good 6-8 deposited on the deepest storage space in the storage channel 4 to a lateral wall 69 facing away from the end edge 65. The transport elements 48 are then moved into the operating position. The control unit 8 controls the extending movement of the transport device 32, and the control unit 8 also determines the extension distance, preferably from the previously measured length dimension 9 (actual value of the length dimension 9) of the piece good 6-8 or from the sum of the previously measured length dimensions 9 (actual values of the length dimensions 9) of the piece goods 6-8. In principle, however, it would also be possible for the control unit 8 to determine the extension distance from the target value of the length dimension 9 of the piece good 6-8 or the target values of the length dimensions 9 of the piece goods 6-8, given that the length dimension 9 of every piece good 6-8 is stored in the reference data.

FIG. 9d illustrates how the storage of two piece goods 6-8 is reorganized. If there is only one piece good 6-8 in the storage channel 4, just this one piece good 6-8 will be moved. In the embodiment illustrated, the (two) piece goods 6-8 are moved from the storage channel 4 onto the piece goods receiving device 2 by moving the transport device 32 in a second direction of movement 70 (retrieval direction). As described above, the rear transport elements 48 by reference to the second direction of movement 70 are moved into the operating position before the transport device 32 is moved back into the initial position on the piece goods receiving device 2. When the transport device 32 is moved back into the initial position, the (two) piece goods 6-8 are moved by the transport elements 48 as they are moved into the operating position. The first piece good 6-8 having been transferred to the piece goods receiving device 2, the conveyor device 33 is also driven so that the speed of motion of the transport device 32 and the conveying speed of the conveyor device 33 are substantially synchronized. As a result, the (three) piece goods 6-8 that are already on the conveyor device 33 and the (two) piece goods 6-8 which still have to be transferred to the conveyor device 33 are moved simultaneously in a second direction of movement 70 (retrieval direction).

As illustrated in FIG. 9e, the (five) piece goods 6-8 of width class B8 can be positioned by means of the conveyor device 33 on the piece goods receiving device 2 to form the (complete) group of piece goods 61-8 in a direction parallel with the depth direction of the storage channel 4. For example, the piece goods 6-8 are positioned against the stop element 40, having been moved into the operating position, at a distance from the storage channel 4 in which the group of piece goods 61-8 is to be stored (FIG. 3) or against the transport elements 49, having been moved into the operating position by driving the conveyor device 33 in a conveying direction away from storage channel 4, namely in the retrieval direction 70. The transport elements 48 adjacent to the storage channel 4 in which the group of piece goods 61-8 is to be stored are moved back into the initial position.

Figure 9F:
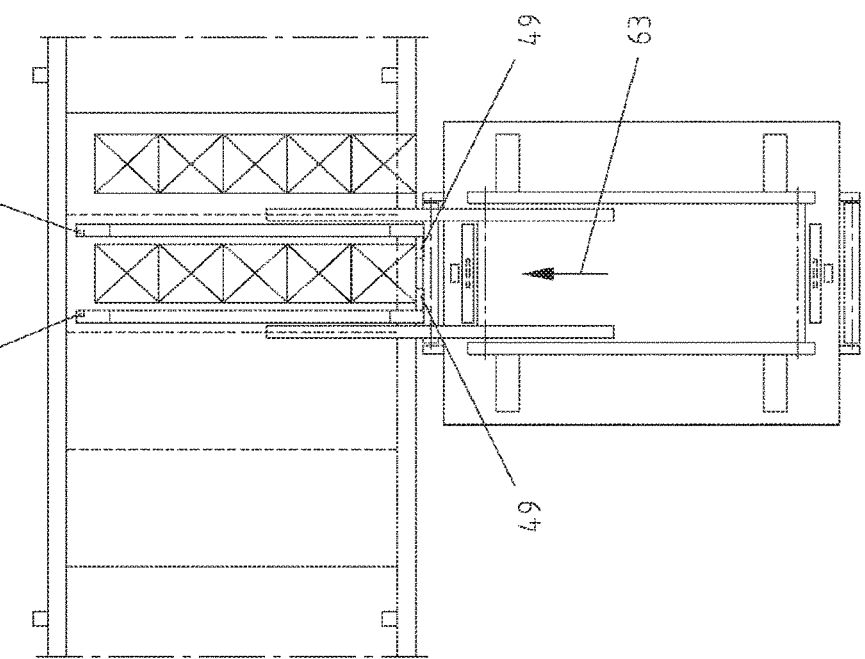

FIG. 9f, finally, illustrates the group of piece goods 61-8 on the piece goods receiving device 2 being moved into the storage channel 4 by means of the transport device 32. The piece goods 6-8 are moved simultaneously in a first direction of movement 63 (storage direction) and in the depth direction of the storage channel 4 to the degree that the lateral wall 64 of the rear-most piece good 6-8 in the direction of movement 63 (storage direction) is substantially flush with an end edge 65 of the storage channel 4. The transport elements 49 are used for this purpose and have been moved into the operating position. Before moving the group of piece goods 61-8 from the piece goods receiving device 2 into the storage channel 4, the piece goods 6-8 of the group of piece goods 61-8 on the piece goods receiving device 2 can be oriented in a direction extending transversely to the longitudinal extension of the storage channel 4. For example, it is possible for the group of piece goods 61-8 to be positioned relative to the piece goods receiving device 2 by a centering stroke of the telescopic units 42 before being moved into the storage channel 4 so that the piece goods 6-8 are aligned in a row exactly one after the other before they are conveyed into the storage channel 4.

FIG. 10a-10b illustrates a group of piece goods 61-8 being retrieved, based on a situation where the group of piece goods 61-8 is on the piece goods receiving device 2 positioned in front of a storage channel 4. Alternatively, it would also be possible for just one piece good 6-8 to be retrieved from the storage channel 4. The number of piece goods 6-8 to be retrieved is fixed by a picking order or disbursement order. To this end, the disbursement order is electronically detected, for example at an input device (computer). The disbursement order may be made up of a plurality of piece goods 6 of the same type, in which case whole groups of piece goods 61-8 can be retrieved, thereby resulting in a high degree of retrieval efficiency.

During the retrieval operation, an individual piece good 6-8 or the group of piece goods 61-8 is moved by means of the transport device 32 from the storage channel 4 onto the piece goods receiving device 2 in such a way that the transport device 32 moves all of the piece goods 6-8 located in the storage channel 4 simultaneously in a second direction of movement 70 (retrieval direction) and out of the storage channel 4 to the degree that the desired number of piece goods 6-8 or the group of piece goods 61-8 is positioned on the piece goods receiving device 2.

As illustrated in FIG. 10a, the transport device 32 is extended in the z-direction to the degree that it moves past the piece good 6-8 (being one of several piece goods 6-8) that was deposited on the deepest storage space in the storage channel 4 at a lateral wall 69 facing away from the end edge 65. The transport elements 48 are then moved into the operating position. The control unit 8 controls the extension movement of the transport device 32 and the extension distance is determined by the control unit 8, preferably from the previously measured length dimension 9 (actual value of the length dimension 9) of a piece good 6-8 or from the sum of the previously measured length dimensions 9 (actual values of the length dimensions 9) of several piece goods 6-4. In principle, however, it would also be possible for the control unit 8 to determine the extension distance from the target values of the length dimensions 9 of the piece goods 6-4 given that the length dimension 9 of every piece good 6-4 is stored in the reference data.

As the transport device 32 is moved back into the initial position, the (four) piece goods 6-8 are moved by the transport elements 48 as they are moved into the operating position. With the transfer of the first piece good 6-8 to the piece goods receiving device 2, the conveyor device 33 is also driven in such a way that the speed of motion of the transport device 32 and the conveying speed of the conveyor device 33 are substantially synchronized. The piece goods 6-8 are positioned on the piece goods receiving device 2 against the stop element 40 at a distance from the storage channel 4 from which the piece goods 6-8 were retrieved, which has now been moved into the operating position, or against the remote transport elements 49, which have been moved into the operating position, by driving the conveyor device 33 in a conveying direction away from the storage channel 4, namely in the retrieval direction 70.

When the group of piece goods 61-8 has been transferred to the piece goods receiving device 2, the piece goods receiving device 2 is moved to the second conveyor device 52 and positioned in front of the second conveyor device 52. The group of piece goods 61-8 is then conveyed away on the second conveyor device 52.

Finally, it should be pointed out that the illustrated storage system represents one possible embodiment. Alternatively, it would also be possible for the piece goods receiving device 2 to be disposed on a lifting platform device which is stationary and comprises a lifting platform which can be moved vertically in the y-direction and at least one piece goods receiving device 2 which can be moved along the lifting platform in the x-direction. Mounted on the piece goods receiving device 2 is a transport device 32 which can be extended out from it in a z-direction into the storage channel 4. Alternatively, the storage system may also comprise a plurality of piece goods receiving devices 2 which are mounted on a travelling unit which can be moved exclusively in the x-direction in each case. Such travelling units are known from the prior art and are so-called single-level storage and retrieval devices (shuttles), see WO 2013/090970 A2, for example.

It should also be pointed out that a combination of the storage principle and/or retrieval principle described above and the storage principle and/or retrieval principle known from U.S. Pat. No. 6,923,612 B2 is also possible. In this case, the transport device 32 described above for storing piece goods 6 in the storage channels 4 and retrieving piece goods 6 from the storage channels 4 is equipped with an additional transport element on every second rail 45 disposed between the outer transport elements 48, 49, and the additional transport element is coupled with a drive motor by means of which it can be moved between an initial position and an operating position. For the method described above, the additional transport elements are always held in the (inactive) initial position. However, if the transport device 32 is used to operate the storage principle and/or retrieval principle described in U.S. Pat. No. 6,923,612 B2, the control unit 8 may also activate these additional transport elements. Based on such a combination of storage principle and/or retrieval principle, storage zones 16, 17 can be created in which the piece goods 6 in the storage channels 4 are stored one against the other in a tightly packed manner, on the one hand, and the piece goods 6 are stored in the storage channels 4 respectively at a mutual distance from one another, on the other hand.

The embodiments illustrated as examples represent possible variants of the storage system, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

Above all, the individual embodiments of the subject matter illustrated in FIGS. 1 to 10 constitute independent solutions proposed by the invention in their own right.

For the sake of good order, finally, it should be pointed out that, in order to provide a clearer understanding of the structure of the storage system, it and its constituent parts are illustrated to a certain extent out of scale and/or on an enlarged scale and/or on a reduced scale.

| | List of reference numbers |
|---|---|
| 1 | Storage rack |
| 2 | Piece goods receiving device |
| 3 | Conveying system |
| 4 | Storage channel |
| 5 | Rack level |
| 6 | Piece good |
| 7 | Width dimension |
| 8 | Control unit |
| 9 | Length dimension |
| 10 | Front rack post |
| 11 | Rear rack post |
| 12 | Front cross-member |
| 13 | Rear cross-member |
| 14 | Storage shelf |
| 15 | Storage surface |
| 16 | Storage zone |
| 17 | Storage zone |
| 18 | Support frame |
| 19 | Rack aisle |
| 20 | Travelling unit |
| 21 | Mast |
| 22 | Bottom running gear |
| 23 | Top running gear |
| 24 | Bottom running rail |
| 25 | Top running rail |
| 26 | Lifting drive |
| 27 | Traction mechanism |
| 28 | Drive motor |
| 29 | Drive unit |
| 30 | Drive motor |
| 31 | Drive roller |
| 32 | Transport device |
| 33 | Conveyor device |
| 34 | Transport surface |
| 35 | Storage depth |
| 36 | Drive motor |
| 37 | Supporting means |
| 38 | Conveyor device |
| 39 | Stop element |
| 40 | Stop element |
| 41 | Measuring device |
| 42 | Telescopic units |
| 43 | Base frame |
| 44 | Rail |
| 45 | Rail |

| | List of reference numbers |
|---|---|
| 46 | Drive motor |
| 47 | Drive motor |
| 48 | Transport element |
| 49 | Transport element |
| 50 | Drive motor |
| 51 | Conveyor device |
| 52 | Conveyor device |
| 53 | Pick-up station |
| 54 | Stop element |
| 55 | Actuator drive |
| 56 | Belt converter |
| 57 | Transfer section |
| 58 | Measuring station |
| 59 | Evaluation module |
| 60 | Analyzer module |
| 61 | Group of piece goods |
| 62 | Compacting device |
| 63 | Storage direction |
| 64 | Lateral wall |
| 65 | End edge |
| 66 | Evaluation module |
| 67 | Goods-out section |
| 68 | Goods-in section |
| 69 | Lateral wall |
| 70 | Retrieval direction |

The invention claimed is:

1. A method for storing piece goods (6) of different dimensions in storage channels (4) of a storage rack (1) having a plurality of storage channels (4), whereby the piece goods (6) are conveyed to the storage channels (4) by means of a piece goods receiving device (2) which can be moved along the storage rack (1) in a first direction (x-direction) and into the storage channels (4) by means of a transport device (32) which can be extended out from the piece goods receiving device (2) into the storage channel (4) in a second direction (z-direction), and the piece goods (6) are stored one against the other in a tightly packed manner in the storage channels (4) respectively, comprising the steps:

detecting, by means of a control unit (8), at least one width dimension (7) of the piece goods (6), which width dimension (7) extends transversely to the longitudinal extension of the storage channel (4) when the piece good (6) has been stored in the storage channel (4), designating width classes and assigning the piece goods (6) to the respective width classes by the control unit (8), feeding the piece goods (6) in a selective manner according to width class to at least one pick-up station (53) by means of a conveying system (3), designating at least one storage channel (4) from a number of storage channels (4) and a storage depth (35) in the designated storage channel (4) in which the piece goods (6) of a single width class should be stored, positioning the piece goods receiving device (2) in front of the pick-up station (53), transferring to the piece goods receiving device (2) those piece goods (6) of this width class which should be stored in the designated storage channel (4), lining up the piece goods (6) on the piece goods receiving device (2) one against the other in a tightly packed manner to form a group of piece goods (61), positioning the piece goods receiving device (2) in front of the designated storage channel (4), moving the group of piece goods (61) from the piece goods receiving device (2) into the storage channel (4)

by means of the transport device (32) such that the piece goods (6) are moved simultaneously in a first direction of movement (storage direction 63) and in the depth direction of the storage channel (4) to such a degree that the lateral wall (64) of the rearmost piece good (6) in the direction of movement (storage direction 63) is substantially flush with an end edge (65) of the storage channel (4), comprising the steps:

designating at least one storage channel (4) from a number of storage channels (4) in which one piece good (6) of a width class or several piece goods (6) of a single width class is/are already being temporarily stored, determining, by the control unit (8), a storage depth (35) in the designated storage channel (4) which remains free after deduction of the length dimension (9) of the temporarily stored piece good (6) or temporarily stored piece goods (6), determining, by the control unit (8), the piece goods (6) which can be additionally stored in the designated storage channel (4) for this width class, transferring to the piece goods receiving device (2) those piece goods (6) which can be additionally stored in the designated storage channel (4) for this width class, optionally, lining up the piece goods (6) on the piece goods receiving device (2) one against the other in a tightly packed manner to form a group of piece goods (61), positioning the piece good (6) or group of piece goods (61) on the piece goods receiving device (2) by means of a conveyor device (33) comprising the piece goods receiving device (2), positioning the piece goods receiving device (2) in front of the designated storage channel (4), moving a piece good (6) already disposed in the storage channel (4) or a group of piece goods (61) already disposed in the storage channel (4) from the storage channel (4) onto the piece goods receiving device (2) by means of the transport device (32) such that the piece good (6) or group of piece goods (61) is moved in a second direction of movement (retrieval direction 70), aligning and positioning the piece goods (6) on the piece goods receiving device (2) so that the piece good (6) or group of piece goods (61) on the piece goods receiving device (2) and the piece good (6) or group of piece goods (61) from the storage channel (4) lie one against the other in a tightly packed manner and are positioned relative to one another in a direction extending transversely to the longitudinal extension of the storage channel (4), moving the resultant group of piece goods (61) from the piece goods receiving device (2) into the storage channel (4) by means of the transport device (32) such that the piece goods (6) are moved simultaneously in a first direction of movement (storage direction 63) and to such a degree in the depth direction of the storage channel (4) that the lateral wall (64) of the rearmost piece good (6) in the direction of movement (storage direction 63) is substantially flush with an end edge (65) of the storage channel (4).

2. The method according to claim 1, further comprising the steps:

designating width classes having at least a first width class and a second width class, assigning the different piece goods (6) to the first width class and second width class, designating storage zones (16, 17) having at least a first storage zone (16) and a second storage zone (17), providing a plurality of first storage channels (4) in the first storage zone (16), providing a plurality of second storage channels (4) in the second storage zone (17), moving the group of piece goods (61) comprising the piece goods (6) of the first width class by means of the transport device (32) from the piece goods receiving device (2) into one of the first storage channels (4), moving the group of piece goods (61) comprising the piece goods (6) of the second width class by means of the transport device (32) from the piece goods receiving device (2) into one of the second storage channels (4).

3. The method according to claim 1, further comprising the steps:

measuring the piece goods (6) at a measuring station (58) before transferring them to the piece goods receiving device (2), determining a width dimension (7) of each piece good (6) extending transversely to the longitudinal extension of the storage channel (4) when the piece good (6) has been stored in the storage channel (4), determining a length dimension (9) of each piece good (6) extending in the direction of the longitudinal extension of the storage channel (4) after the piece good (6) has been stored in the storage channel (4), transmitting the measurement values for each piece good (6) to the control unit (8), evaluating the measurement values for each piece good (6) by means of the control unit (8), activating the transport device (32) and/or conveying system (3) by means of the control unit (8) based on the evaluation of the measurement values for each piece good (6).

4. The method according to claim 1, further comprising the steps:

measuring the piece goods (6) at a measuring station (58) before transferring them to the piece goods receiving device (2), determining at least a length dimension (9) of each piece good (6) extending in the direction of the longitudinal extension of the storage channel (4) when the piece good (6) has been stored in the storage channel (4), transmitting the measurement values of each piece good (6) to the control unit (8), calculating the number of piece goods (6) based on the storage depth (35) and the length dimension (9) of each individual piece good (6), feeding the piece goods (6) selectively according to width class and in the corresponding number to the pick-up station (53), positioning the piece goods receiving device (2) in front of the pick-up station (53), transferring to the piece goods receiving device (2) the fed piece goods (6) belonging to this width class and in the corresponding number which should be stored in the designated storage channel (4).

5. The method according to claim 1, further comprising the steps:

calculating a target length of the group of piece goods (61) after transferring and aligning the piece goods (6) on the piece goods receiving device (2), the target length being defined on the basis of the length dimension (9) of the piece goods (6) within the group of piece goods (61), detecting an actual length of the group of piece goods (61) after transferring and aligning the piece goods (6) on the piece goods receiving device (2) by means of a sensor system (41), comparing the target length with the actual length by means of the control unit (8), triggering a monitoring signal by means of the control unit (8) if the actual length deviates from the target length.

6. The method according to claim 1, further comprising the steps:

aligning the piece goods (6) of the group of piece goods (61) on the piece goods receiving device (2) in a direction extending transversely to the longitudinal extension of the storage channel (4) and prior to moving the group of piece goods (61) from the piece goods receiving device (2) into the storage channel (4).

7. The method according to claim 1, further comprising the steps:

positioning the piece goods (6) of the group of piece goods (61) on the piece goods receiving device (2) in a direction parallel with the longitudinal extension of the storage channel (4) and prior to moving the group of piece goods (61) from the piece goods receiving device (2) into the storage channel (4).

8. The method according to claim 1, whereby in order to retrieve piece goods (6) from one of the storage channels (4), the following steps are implemented:

positioning the piece goods receiving device (2) in front of the storage channel (4) from which one or more piece goods (6) are to be retrieved, moving individual piece goods (6) or the group of piece goods (61) from the storage channel (4) onto the piece goods receiving device (2) by means of the transport device (32) such that the transport device (32) moves all of the piece goods (6) disposed in the storage channel (4) simultaneously in the second direction of movement (retrieval direction 70) and out of the storage channel (4) to the degree that the desired number of piece goods (6) or the group of piece goods (61) is/are positioned on the piece goods receiving device (2).

9. A storage system comprising a storage rack (1) having a plurality of storage channels (4), at least one piece goods receiving device (2) which can be moved along the storage rack (1) in a first direction (x-direction) and a transport device (32) which can be extended out from the piece goods receiving device (2) in a second direction (z-direction) into the storage channel (4) as well as a control unit (8) for the piece goods receiving device (2) and transport device (32), and the storage rack (1), in particular the storage channels (4), are configured to store piece goods (6) of different dimensions in the storage channels (4) one against the other in a tightly packed manner, and the control unit (8) is configured to:

detect at least a width dimension (7) of the piece goods (6) in an electronic evaluation module (59), which width dimension (7) extends transversely to the longitudinal extension of the storage channel (4) when the piece good (6) has been stored in the storage channel (4), designate width classes and assign the piece goods (6) to the respective width classes, designate at least one storage channel (4) from a number of storage channels (4) and determine a storage depth (35) for this storage channel (4), in which storage channel (4) only piece goods (6) of a single width class are stored, control a conveying system (3) in order to convey the piece goods (6) selectively according to width class to a pick-up station (53), control the piece goods receiving device (2) in order to position it in front of the pick-up station (53) and, afterwards, to transfer to the piece goods receiving device (2) those piece goods (6) of this width class which should be stored in the designated storage channel (4), and the piece goods (6) are lined up on the piece goods receiving device (2) one against the other in a tightly packed manner to form a group of piece goods (61), control the piece goods receiving device (2) in order to position it in front of the designated storage channel (4) and, afterwards, to move the group of piece goods (61) by means of the transport device (32) from the piece goods receiving device (2) into the storage channel (4), in doing so the piece goods (6) are moved simultaneously in a first direction of movement (storage direction 63) and in the depth direction of the storage channel (4) to the degree that the lateral wall (64) of the rearmost piece good (6) in the direction of movement (storage direction 63) is substantially flush with an end edge (65) of the storage channel (4), wherein the control unit (8) is further configured to:

designate at least one storage channel (4) from a number of storage channels (4) in which a piece good (6) of a width class or several piece goods (6) of a single width class is/are already being temporarily stored, determine a storage depth (35) in the designated storage channel (4) which remains free after deduction of the length dimension (9) of the temporarily stored piece good (6) or temporarily stored piece goods (6), determine the piece goods (6) which can be additionally stored in the designated storage channel (4) for this width class, control the conveying system (3) and/or the piece goods receiving device (2) in order to transfer to the piece goods receiving device (2) those piece goods (6) which can be additionally stored in the designated storage channel (4) for this width class, and a piece good (6) or several of the piece goods (6) on the piece goods receiving device (2) are lined up one against the other in a tightly packed manner to form a group of piece goods (61), control the piece goods receiving device (2) or the transport device (32) in order to position the piece good (6) or group of piece goods (61), control the piece goods receiving device (2) in order to position it in front of the designated storage channel (4), control the piece goods receiving device (2) and/or the transport device (32) in order to move a piece good (6) already disposed in the storage channel (4) or a group of piece goods (61) already disposed in the storage channel (4) by means of the transport device (32) from the storage channel (4) onto the piece goods receiving device (2) such that the piece good (6) or group of piece goods (61) is moved in a second direction of movement (retrieval direction 70), control the piece goods receiving device (2) and/or the transport device (32) in order to line up and position the piece goods (6) on the piece goods receiving device (2) one after the other so that the piece good (6) or group of piece goods (61) on the piece goods receiving device (2) and the piece good (6) or group of piece goods (61)

from the storage channel (4) lie one against the other in a tightly packed manner and are positioned relative to one another, control the piece goods receiving device (2) and/or the transport device (32) in order to move the resultant group of piece goods (61) by means of the transport device (32) from the piece goods receiving device (2) into the storage channel (4) such that the piece goods (6) are moved simultaneously in a first direction of movement (storage direction 63) and to such a degree in the depth direction of the storage channel (4) that the lateral wall (64) of the rearmost piece good (6) in the direction of movement (storage direction 63) is substantially flush with an end edge (65) of the storage channel (4).

10. The storage system according to claim 9, wherein the piece goods receiving device (2) comprises a motorized conveyor device (33), the transport device (32) and stop elements (39, 40), and the motorized conveyor device (33), transport device (32) and stop elements (39, 40) are mounted on a support frame (18), and the stop elements (39, 40) are disposed in the oppositely lying end regions of the motorized conveyor device (33) and can be moved between an initial position in which they are moved out of the transport path of the piece goods (6) along the conveyor device (33) and an operating position in which they are moved into the transport path of the piece goods (6) along the conveyor device (33).

11. The storage system according to claim 9, wherein the piece goods receiving device (2) comprises a motorized conveyor device (33), the transport device (32) and a sensor system (41), and the motorized conveyor device (33) and transport device (32) are mounted on a support frame (18), and the sensor system (41) is configured to detect the piece goods (6) on the piece goods receiving device (2) and is connected to the control unit (8) in order to determine an actual length of the group of piece goods (61) on the piece goods receiving device (2).

12. The storage system according to claim 9, wherein the piece goods receiving device (2) comprises a motorized conveyor device (33) and the transport device (32), and the motorized conveyor device (33) and transport device (32) are mounted on a support frame (18), and the transport device (32) has telescopic units (42) disposed parallel with longitudinal sides of the conveyor device (33), and the telescopic units (42) respectively comprise a base frame (43), a first rail (44) that is displaceable relative to the base frame (43) and a second rail (45) that is displaceable relative to the first rail (44), and the second rail (45) is provided with a transport element (48, 49) respectively at its oppositely lying end regions, and the transport elements (48, 49) can be moved between an initial position in which they are moved out of the transport path of the piece goods (6) along the conveyor device (33) and an operating position in which they are moved into the transport path of the piece goods (6) along the conveyor device (33).

13. The storage system according to claim 12, wherein the motorized conveyor device (33) comprises a belt conveyor, the transport surface (34) of which substantially corresponds in terms of length to the maximum storage depth (35) of the storage rack (1) and in terms of width to substantially the maximum width dimension (7) of a piece good (6).

14. The storage system according to claim 9, wherein the piece goods receiving device (2) comprises a motorized conveyor device (33), the transport device (32) and supporting means (37), and the motorized conveyor device (33), transport device (32) and supporting means (37) are mounted on a support frame (18), and the supporting means (37) are disposed in the oppositely lying end regions of the motorized conveyor device (33) and are designed so that when the piece goods (6) are being moved between the piece goods receiving device (2) and storage channel (4), the piece goods (6) can lie on the supporting means (37).

15. The storage system according to claim 14, wherein the supporting means (37) are provided respectively in the form of a motorized conveyor device (38).

16. A storage system comprising a storage rack (1) having a plurality of storage channels (4), at least one piece goods receiving device (2) which can be moved along the storage rack (1) in a first direction (x-direction) and a transport device (32) which can be extended relative to the piece goods receiving device (2) in a second direction (z-direction) into the storage channel (4) as well as a control unit (8) for the piece goods receiving device (2) and transport device (32), and the storage rack (1), in particular the storage channels (4), are configured to store piece goods (6) of different dimensions in the storage channels (4) lying one against the other in a tightly packed manner, and the control unit (8) is configured to:

detect at least a width dimension (7) of the piece goods (6) in an electronic evaluation module (59), which width dimension (7) extends transversely to the longitudinal extension of the storage channel (4) when the piece good (6) has been stored in the storage channel (4), designate width classes and assign the piece goods (6) to the respective width classes, designate at least one storage channel (4) from a number of storage channels (4) and determine a storage depth (35) for this storage channel (4), in which storage channel (4) only piece goods (6) of a single width class are stored, control a conveying system (3) in order to convey the piece goods (6) selectively according to width class to a pick-up station (53), control the piece goods receiving device (2) in order to position it in front of the pick-up station (53) and, afterwards, to transfer to the piece goods receiving device (2) those piece goods (6) of this width class which should be stored in the designated storage channel (4), and the piece goods (6) are lined up on the piece goods receiving device (2) one against the other in a tightly packed manner to form a group of piece goods (61), control the piece goods receiving device (2) in order to position it in front of the designated storage channel (4) and, afterwards, to move the group of piece goods (61) by means of the transport device (32) from the piece goods receiving device (2) into the storage channel (4), in doing so the piece goods (6) are moved simultaneously in a first direction of movement (storage direction 63) and in the depth direction of the storage channel (4) to the degree that the lateral wall (64) of the rearmost piece good (6) in the direction of movement (storage direction 63) is substantially flush with an end edge (65) of the storage channel (4), wherein the piece goods receiving device (2) comprises a motorized conveyor device (33), the transport device (32), and supporting means (37), and the motorized conveyor device (33), transport device (32) and supporting means (37) are mounted on a support frame (18), and the supporting means (37) are disposed in the oppositely lying end regions of the motorized conveyor device

(33) and are provided respectively in the form of a motorized conveyor device (38) so that when the piece goods (6) are being moved between the piece goods receiving device (2) and the storage channel (4), the piece goods (6) lie on the supporting means (37) and can be provided with a driving force.

17. The storage system according to claim 16, wherein the transport device (32) is mounted on the support frame (18), and the transport device (32) has telescopic units (42) disposed parallel with longitudinal sides of the conveyor device (33), and the telescopic units (42) respectively comprise a base frame (43), a first rail (44) that is displaceable relative to the base frame (43) and a second rail (45) that is displaceable relative to the first rail (44), and the second rail (45) is provided with a transport element (48, 49) respectively at its oppositely lying end regions, and the transport elements (48, 49) can be moved between an initial position in which they are moved out of the transport path of the piece goods (6) along the conveyor device (33) and an operating position in which they are moved into the transport path of the piece goods (6) along the conveyor device (33).

18. The storage system according to claim 16, wherein the motorized conveyor device (33) comprises a belt conveyor, the transport surface (34) of which substantially corresponds in terms of length to the maximum storage depth (35) of the storage rack (1) and in terms of width to substantially the maximum width dimension (7) of a piece good (6).

19. The storage system according to claim 16, wherein the piece goods receiving device (2) further comprises stop elements (39, 40), and the motorized conveyor device (33), transport device (32) and stop elements (39, 40) are mounted on a support frame (18), and the stop elements (39, 40) are disposed in the oppositely lying end regions of the motorized conveyor device (33) and can be moved between an initial position in which they are moved out of the transport path of the piece goods (6) along the conveyor device (33) and an operating position in which they are moved into the transport path of the piece goods (6) along the conveyor device (33).

20. The storage system according to claim 16, wherein the piece goods receiving means (2) further comprises a sensor system (41), and the motorized conveyor device (33) and transport device (32) are mounted on a support frame (18), and the sensor system (41) is configured to detect the piece goods (6) on the piece goods receiving device (2) and is connected to the control unit (8) in order to determine an actual length of the group of piece goods (61) on the piece goods receiving device (2).

* * * * *